US008724679B2

(12) United States Patent
Lakkis

(10) Patent No.: US 8,724,679 B2
(45) Date of Patent: May 13, 2014

(54) METHOD AND APPARATUS OF TRANSCEIVER CALIBRATION USING SUBSTRATE COUPLING

(75) Inventor: Ismail Lakkis, San Diego, CA (US)

(73) Assignee: Tensorcom, Inc., Carlsbad, CA (US)

( * ) Notice: Subject to any disclaimer, the term of this patent is extended or adjusted under 35 U.S.C. 154(b) by 148 days.

(21) Appl. No.: 13/442,387

(22) Filed: Apr. 9, 2012

(65) Prior Publication Data

US 2013/0266045 A1  Oct. 10, 2013

(51) Int. Cl.
*H04B 1/38* (2006.01)
(52) U.S. Cl.
USPC ........... 375/219; 375/221; 375/222; 375/224; 375/295; 375/316; 455/86; 455/305; 455/324; 324/76.11; 324/500; 324/600; 702/108; 379/27.01
(58) Field of Classification Search
USPC .................. 375/219, 221, 222, 224, 295, 316; 455/86, 305, 324; 324/76.11, 500, 600; 702/108; 379/27.01
See application file for complete search history.

(56) References Cited

U.S. PATENT DOCUMENTS

| 8,135,055 B2 * | 3/2012 | Kohlmann | 375/224 |
| 2008/0233893 A1 | 9/2008 | Duperray | |
| 2010/0120369 A1 | 5/2010 | Ko | |
| 2011/0075715 A1 | 3/2011 | Kravitz | |
| 2011/0218755 A1 | 9/2011 | Dyayni | |

FOREIGN PATENT DOCUMENTS

EP          1219054         12/2004

OTHER PUBLICATIONS

U.S. Appl. No. 13/243,880, Zaw Soe.
U.S. Appl. No. 13/243,986, Zaw Soe.
U.S. Appl. No. 13/312,806, Zaw Soe.

* cited by examiner

*Primary Examiner* — Leon Flores
(74) *Attorney, Agent, or Firm* — Thaddeus Gabara; Tyrean Patent Prosecution Law Firm

(57) ABSTRACT

Transceiver calibration is a critical issue for proper transceiver operation. The transceiver comprises at least one RF transmit chain and one RF receive chain. A closed loop path is formed from the digital block, the RF transmit chain, the substrate coupling, the RF receive chain back to the digital block and is used to estimate and calibrate the transceiver parameters over the operating range of frequencies. The substrate coupling eliminates the need for the additional circuitry saving area, power, and performance. In place of the additional circuitry, the digital block which performs baseband operations can be reconfigured into a software or/and hardware mode to calibrate the transceiver. The digital block comprises a processor and memory and is coupled to the front end of the RF transmit chain and the tail end of the RF receive chain.

15 Claims, 17 Drawing Sheets

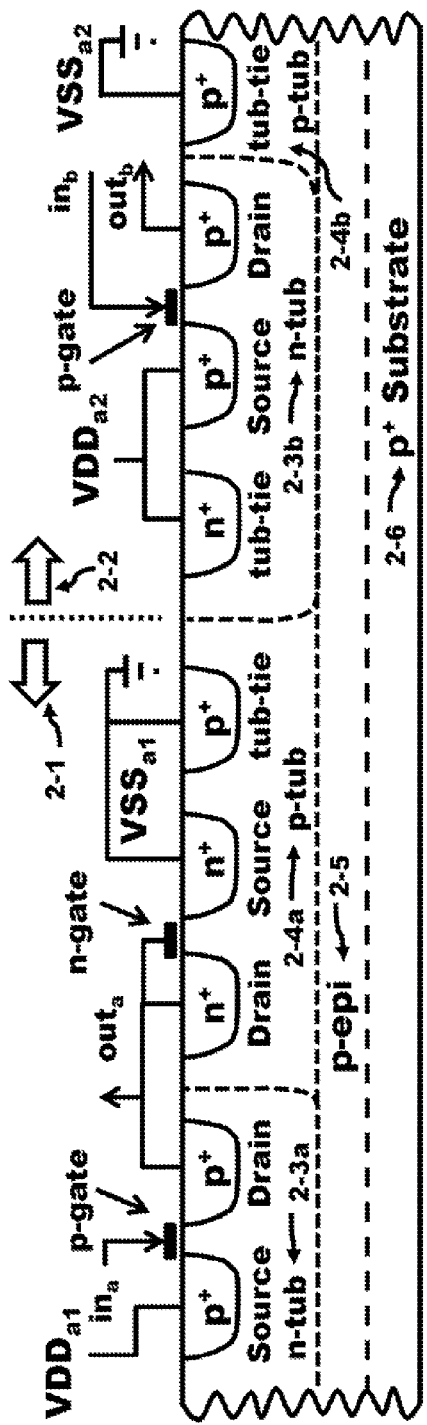
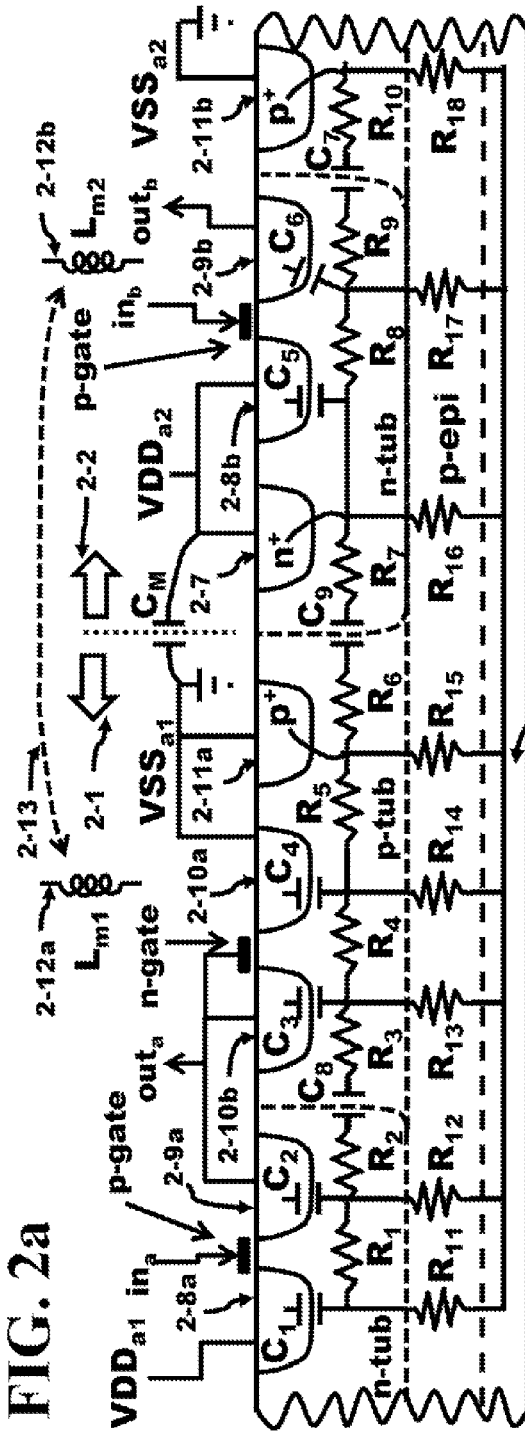
FIG. 2a
FIG. 2b

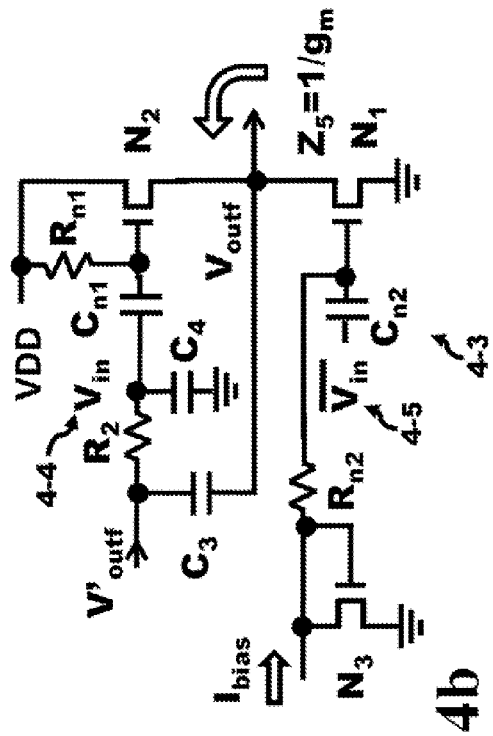
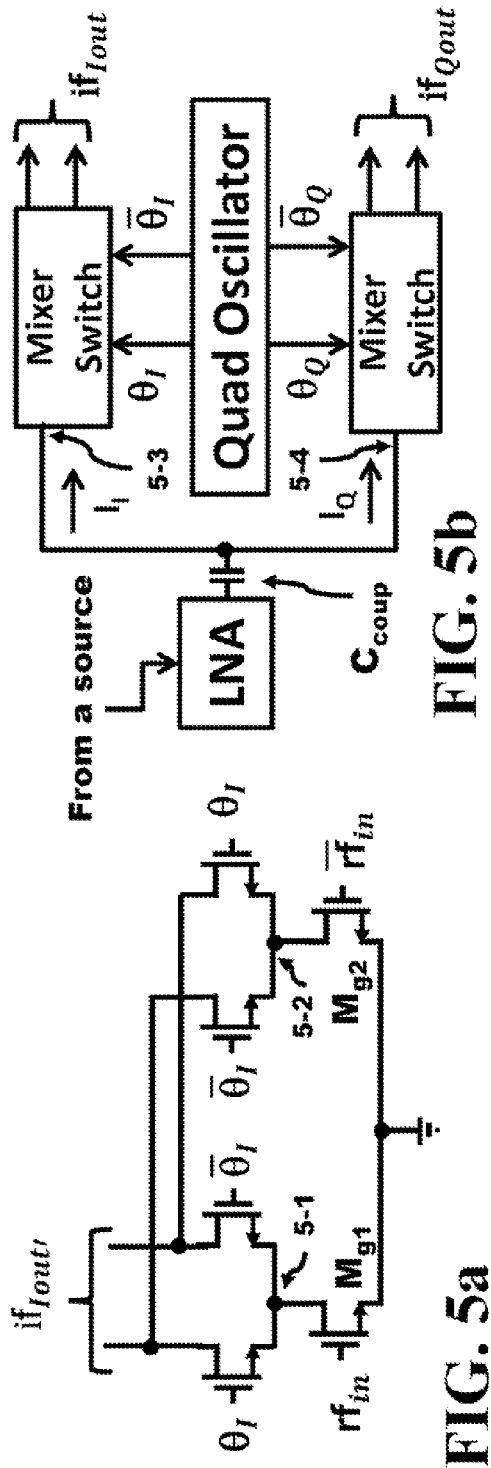
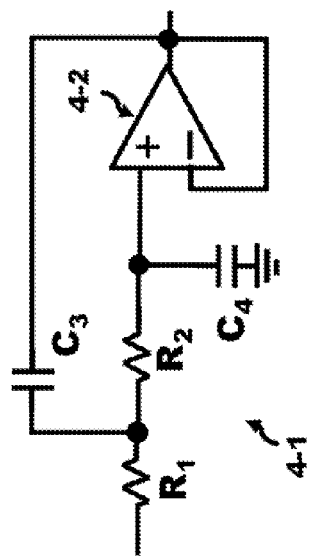
FIG. 4a
FIG. 4b
FIG. 5a
FIG. 5b

METHOD AND APPARATUS OF TRANSCEIVER CALIBRATION USING SUBSTRATE COUPLING

CROSS REFERENCE TO RELATED APPLICATIONS

U.S. patent application Ser. No. 13/243,880, filed Sep. 23, 2011 by Zaw Soe under the title, "Differential Source Follower having 6 dB Gain with Applications to WiGig Baseband Filters"; U.S. patent application Ser. No. 13/243,986, filed Sep. 23, 2011 by Zaw Soe under the title, "Method and Apparatus of Minimizing Extrinsic Parasitic Resistance in 60 GHz Power Amplifier Circuits"; and U.S. patent application Ser. No. 13/312,806, filed Dec. 6, 2011 by Zaw Soe under the title, "Method and Apparatus of an Input Resistance of a Passive Mixer to Broaden the Input Matching Bandwidth of a Common Source/Gate LNA" all commonly assigned herewith, disclose certain subject matter which is common hereto.

BACKGROUND OF THE INVENTION

The Federal Communications Commission (FCC) has allotted a spectrum of bandwidth in the 60 GHz frequency range (57 to 64 GHz). The Wireless Gigabit Alliance (WiGig) is targeting the standardization of this frequency band that will support data transmission rates up to 7 Gbps. Integrated circuits, formed in semiconductor die, offer high frequency operation in this millimeter wavelength range of frequencies. Some of these integrated circuits utilize Complementary Metal Oxide Semiconductor (CMOS), Silicon-Germanium (SiGe) or GaAs (Gallium Arsenide) technology to form the dice in these designs. Since WiGig transceivers use carrier frequencies in the range of 60 GHz, parasitic capacitance can transfer these high frequency signals into other circuit components of the system design causing undesirable effects, particularly through substrate coupling. These effects can impact the performance and behavior of receiver and transmitter units. These parasitic capacitances are carefully monitored and are minimized, if possible, to reduce these undesirable effects.

CMOS (Complementary Metal Oxide Semiconductor) is the primary technology used to construct integrated circuits. N-channel devices and P-channel devices (MOS device) are used in this technology which uses fine line technology to consistently reduce the channel length of the MOS devices. Current channel lengths examples are 40 nm, the power supply of VDD equals 1.2V and the number of layers of metal levels can be 8 or more. This technology typically scales with technology.

CMOS technology delivers a designer with the ability to form very large system level design on one die known as a System On a Chip (SOC). The SOC are complex systems with millions, if not billions, of transistors which contain analog circuits and digital circuits. The analog circuits operate purely analog, the digital circuits operate purely digital and these two circuits types can be combined together to form circuits operating in a mixed-signal.

For example, digital circuits in their basic form only use digital logic and some examples can be a component comprising at least one; processor, memory, control logic, digital I/O circuit, reconfigurable logic and/or hardware programmed that to operate as hardware emulator. Analog circuits in their basic form only use only analog circuits and some examples can be a component comprising at least one; amplifier, oscillator, mixer, and/or filter. Mixed signal in their basic form only use both digital and analog circuits and some examples can be a component comprising at least one: DAC (Digital to Analog Convertor), Analog to Digital Converter (ADC), Power Supply control, Phase Lock Loop (PLL), and/or device behavior control over Process, Voltage and Temperature (PVT). The combination of digital logic components with analog circuit components can appear to behave like mixed signal circuits; furthermore, these examples that have been provided are not exhaustive as one knowledgeable in the arts understands.

The SOC can generate a large amount of switching noise that couples through parasitic reactances formed in the die and between metal layers and could become a hostile environment for critical analog circuits. Analog designers attempt to minimize this form of noise coupling using any know means in the art, if possible. Such noise coupling, for example, can influence the operation of two or more oscillators to phase lock together even though the desired intent was to maintain a frequency difference between the two oscillators on the die.

Transceivers comprise at least one transmitter and at least one receiver and are used to interface to other transceivers in a communication system. One version of the transmitter can comprise at least one of each: DAC, LPF (Low Pass Filter), mixer, local oscillator, power amplifier and interface port that are coupled forming a RF (Radio Frequency) transmit chain. One version of the receiver can comprise at least one of each: interface port, LNA (Low Noise Amplifier), mixer, BB (Base Band) amplifier, LPF and ADC that are coupled forming a RF receive chain. The interface port can be shared between the two chains. In other situations, at least one interface port can be associated with each chain. Furthermore, each RF transmit and receive chains can operate on an in-phase (I) signal and the quadrature-phase (Q) signal simultaneously. Both RF transmit and RF receive chains can comprise other components known in the art to interface to other transceivers; they can be a homodyne system, heterodyne system, or a low IF system. Although the interface port is shown as an antenna; the interface port can be a transmission line, a transformer interface, or any means of interfacing to other transceivers. The transmit and receive chains are usually coupled to a block that performs baseband operations.

One of the critical design parameters of a transceiver occurs between the in-phase (I) and the quadrature-phase (Q) signals in the transmit and receive chains. Ideally, the amplitude of and phase difference between these (In-phase/Quadrature Phase) I/Q signals must remain constant with a 90° separation over a range of frequencies. However, due to mismatches between fabricated devices, process variations, temperature changes, voltage variations, layout structures, adjacent layout structures and their parasitic reactances etc., maintaining the same amplitude and 90° phase difference over the desired range of operating frequencies is a challenging task. Various methods and circuits as are well known in the art can be used to minimize the amplitude variations and maintain nearly a 90° phase separation between the I/Q signals over the operating range of frequencies.

Often, these methods and circuits to maintain the amplitudes constant and maintain nearly a 90° phase separation between the I/Q signals over the operating range of frequencies increase the use of die area (a valuable commodity in a chip), increase the use of analog and/or digital circuits (causing an increase in overall power dissipation), and thereby adding complexity to the overall transceiver. Incorporating these techniques into the design causes shortcomings, such as, the chip cost to increase, shorter battery life (particularly for portable wireless handheld units) and potentially slower operating behavior (due to added circuits). In addition, the transceiver requires the minimization of LO (Local Oscillator) leakage and requires the LPFs in the transmit and receive chains to have a specific bandwidth. It would be very desirable to overcome these shortcomings, achieving a smaller die, lower power dissipation and faster performance, yet still minimize the amplitude variations and maintain nearly a 90° phase separation between the I/Q signals, control the bandwidth of the LPFs and LO leakage over the operating range of frequencies.

BRIEF SUMMARY OF THE INVENTION

The RF transmit and RF receive chains can couple with one another via switching noise generated by each chain when the transceiver is in operation, particularly when the transceiver is on a common substrate. That is, signals are coupled between the RF transmit and RF receive chains via the substrate reactances, substrate impedances and surface metal reactances into the other chain. Each reactance can also have associated resistances. Multiple coupling paths can be formed between these two chains and is typically an undesirable phenomenon for RF designers. These coupling paths typically can reduce the sensitivity of the receiver. Various methods are used by RF designers, as are well known in the art, to minimize this coupling or loopback coupling to improve the performance of the transceiver, such as, incorporating guard rings, differential signaling, and careful layout strategies. The matter can be exacerbated when the switching noise of the remaining components on an SOC are introduced.

The die comprises various structures, such as, metallization, doped tub ties, source regions, drain regions and tubs that are formed in one of the deposited or grown layers of the die. One layer is the epi-layer that is deposited on the starting substrate. In addition, metal traces are deposited and patterned on $SiO_2$ layers formed above the surface of the previous layer. The loopback coupling between the RF transmit and receive chains is formed by the interaction between parasitic components of these various structures within the die. These components include the resistance of the various structures within the die, inductance of the metal traces, the capacitance of the naturally formed diodes between different doped regions of the various structures of the die and the capacitance between adjacent metal traces. While the metallization formed on the surface of the substrate can be patterned to form isolated regions (the metal from one region is isolated from that of a second region); these circuits are still coupled by the parasitic impedance in the substrate, or capacitance and inductance between components from two different isolated regions. The parasitic resistance of the various structures within the die can also couple the isolated regions by the capacitance of the naturally formed diodes and, in a special case, resistively connects the VSS's of the isolated regions together. These coupling formats will be addressed as the Substrate-Reactive-Coupled (SRC) network.

The inventor has discovered that the loopback coupling formed by the SRC network between the RF transmit and RF receive chains on a given die can be used to estimate and calibrate several parameters of both the RF transmit and RE receive chains. This is in stark contrast to the well-known prior art techniques used to perform this estimation and calibration function, where specialized circuitry or blocks were required to perform the estimation and calibration. This invention eliminates the need for the additional circuitry saving area, power, and performance. The digital block components already placed within the SOC such as the microprocessor and memory now serve a dual role. The first role is during a cold start where these digital block components are used in the estimation and calibration of the transceiver. Once the transceiver is calibrated, the microprocessor and memory revert to a second role of a normal operational mode to perform system level functions where the digital block can be reconfigured to perform baseband operations and operates on the incoming and outgoing bit streams carried within the RF transmit and RF receive chains. Thus, instead of the loopback coupling limiting the operation of the SOC, the loopback coupling is embedded into the estimation and calibration of the transceiver and furthermore is included in the compensation process during normal operational mode of the transceiver.

In addition, the inventor has discovered that the switching noise generated by the remaining components in the SOC during the normal operational mode has little influence in altering the compensated RF transmit and RF receive chains against the I/Q imbalance, the transmit LO leakage, and cutoff frequencies of the LPFs. This provides the RF designer with more flexibility in the design of the chains since this switching noise becomes a reduced concern.

One embodiment of the disclosure uses the SRC network that is formed within the substrate of the die or chip between the RF transmit and RF receive chains to estimate the differences between and to compensate for the I/Q signals over the operating range of frequencies. A digital block to perform baseband operations is coupled to the beginning of the RF transmit chain, the RF transmit chain is coupled to the receive chain using the SRC effect, and the end of the receive chain is coupled back to the digital block. The digital block usually is used in one mode to perform baseband operations (henceforth called the digital block). This loop comprises the Digital Block-Transmit (TX) chain-loopback coupling-Receive (RX) Chain-Digital Block path and is called the closed loop path.

The digital block comprises a processor and memory that can be software or hardware programmed for the estimation and calibration block to minimize the imbalance of a receive chain I/Q signals, to minimize the imbalance of a transmit chain I/Q signal, to minimize the transmit LO leakage, to adjust the cutoff frequency of the transmit chain LPFs, and to adjusting the cutoff frequency of the receive chain LPFs. The digital block can also comprise both the combination of a software program and hardware unit configured to interact together. All of the three previous ways of using the digital block to estimate and calibrate the transceiver will be addressed as controlled by the processor.

One of the embodiments of the disclosure uses the closed loop path is to estimate and calibrate the imbalance between the in-phase (I) and the quadrature-phase (Q) signals due to the receive (RX) I/Q imbalance compensation network. The processor in the digital block disables the TX's LPFs and DACs which ideally causes a zero input to be applied to one of the inputs of the transmitter mixers. However, due to mismatches, the 60 GHz clock that is applied to the remaining inputs of the transmitter mixers generates a sinusoid at the output of the transmit chain. This signal is SRC to the RX chain. This sinusoid signal is used to perform the RX I/Q Imbalance using a first estimation and compensation block controlled by the processor.

Another of the embodiments of the disclosure uses the closed loop path to estimate and calibrate the imbalance between the in-phase (I) and the quadrature-phase (Q) signals due to a transmitter Local Oscillator (LO) leakage compensation network. The processor in the digital block disables the TX's LPFs and DACs which ideally causes a zero input to be applied to the one of the inputs of the transmitter mixers;

however, due to mismatch effects strays from the zero value. The 60 GHz clock that is applied to the remaining input of the transmitter mixer generates a sinusoid at the output of the mixer. Low speed DACs from an array are controlled by the processor in the digital block to eliminate this DC voltage that is applied to one set of inputs of the TX mixers. In addition, a low speed DAC adjusts the bias point of the mixers themselves. This signal from the transmit chain is SRC to the RX chain. This sinusoid signal is used to perform the RX I/Q imbalance by measuring and reducing the power envelope of the received I/Q signals output from the receive chain. This procedure uses a second estimation and compensation block controlled by the processor and performs this power measurement until the power is minimized.

Another of the embodiments of the disclosure uses the closed loop path to estimate and calibrate the imbalance between the in-phase (I) and the quadrature-phase (Q) signals due to the TX I/Q imbalance compensation network. The processor in the digital block enables the TX's LPFs and DACs and applies the generated I/Q signals from the digital block to the DACs, LPFs and then the first set of inputs to the TX mixers. The 60 GHz clock that is applied to the remaining inputs of the transmitter mixers up-converts the I/Q signal. This signal is SRC to the RX chain and down-converted by the RX mixers. The I/Q signals are then digitalized and monitored by the processor within the digital block. The amplitude and phase of the I/Q signals are adjusted until the I/Q signals are optimized which performs the TX I/Q imbalance step using a third estimation and compensation block controlled by the processor.

Another of the embodiments of the disclosure uses the closed loop path to calibrate the cut off frequency of each set of the LPFs in the TX/RX chains independently by the Cut Off Freq compensation network. The processor in the digital block sets the control signals to both sets of LPFs to maximum bandwidth. Then, the processor selects one set of LPFs in either the transmit or receive chain and adjusts the bandwidth of these LPFs by measuring the amplitude of the I/Q signal at the digital block until they are at the desired cut off frequency. The processor sets the control signals to both sets of LPFs to maximum bandwidth again. Now, the processor selects the other set of LPFs in the other chain and adjusts the bandwidth of these LPFs until they are at the desired cut off frequency. All of the control signals values are stored in memory. Finally, the process retrieves the previously determined control signals from memory which are applied to the corresponding LPFs which completes the Cut Off Frequency adjustment step using a fourth compensation block controlled by the processor.

Another of the embodiments of the disclosure presents the flow chart that takes the closed loop path from a cold start to the point where the transceiver is fully calibrated. Each step is controlled by the processor which begins the initiation steps by preforming the estimation and/or compensation steps in sequence. One possible sequence includes the first estimation/compensation step, the second estimation/compensation step, the third estimation/compensation step, and the fourth compensation step, then storing each of the results of the compensation step in memory. Before moving to the next compensation step, the results of the previous step are extracted from memory and applied to the previous compensation block. After all compensation results are extracted from memory and applied to all four compensation blocks, the system has finished calibrating the transceiver allowing the TX/RX system to be operated in its fully functional mode.

Various embodiments and aspects of the inventions will be described with reference to details discussed above, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Another embodiment of one of the present inventions is a transceiver comprising: a stimulus signal from an estimation and/or compensation block, coupled to a transmit chain: a substrate-reactive-coupled network coupled to the transmit chain: a receive chain coupled to the substrate-reactive-coupled network; and at least one output of the receive chain coupled to the estimation and/or compensation block, whereby the estimation and/or compensation block generates at least one estimated and/or compensated signal based on the at least one output of the receive chain, further comprising: additional estimation and/or compensation blocks: and the additional estimation and/or compensation blocks generate at least one additional estimated and/or compensated signal based on at least one additional output of the receive chain, further comprising: a processor and a memory and the memory stores all estimated or compensated signals, whereby the processor applies each the compensated signals to a corresponding compensation block to fully calibrate the transceiver, whereby each compensated signal is selected from the group consisting of minimizing imbalance of a receive chain I/Q signal minimizing a transmit LO leakage, minimizing the imbalance of a transmit chain I/Q signal adjusting a cutoff frequency of a transmit chain LPFs and adjusting the cutoff frequency of a receive chain LPFs, whereby the minimized imbalance of an I/Q signal has a substantially equal amplitude and substantially 90° phase separation between the I/Q signals. The transceiver further comprising: a processor and a memory; and the processor instructs the memory to store and retrieve all estimated or compensated signals. The transceiver further comprising: the stimulus signal is an I/Q signal. The transceiver further comprising: the stimulus signal is a control signal.

Another embodiment of one of the present inventions is a transceiver with a digital block and an estimation and/or compensation block comprising the steps of coupling at least one stimulus signal from the estimation and/or compensation block to a transmit chain: coupling a substrate-reactive-coupled network to the transmit chain; coupling a receive chain to the substrate-reactive-coupled network: coupling at least one resultant output of the receive chain to the estimation and/or compensation block: and generating a newer stimulus signal based on the at least one resultant output of the receive chain, whereby each resultant output is selected from the group consisting of minimizing an imbalance of a receive chain I/Q signal, minimizing a transmit LO leakage, minimizing the imbalance of a transmit chain I/Q signal, adjusting a cutoff frequency of a transmit chain LPFs and adjusting the cutoff frequency of a receive chain LPFs, further comprising the steps of: substantially equalizing amplitude of the I/Q signals of the minimized I/Q imbalance signal; and substantially separating the I/Q signals by 90° phase of the minimized I/Q imbalance signal. The method further comprising the steps of: setting at least one stimulus signal to he an I/Q signal. The method further comprising the steps of: setting at least one stimulus signal to be a control signal. The method further comprising the steps of: processing the at least one resultant output of the receive chain with a processor; and storing estimated and/or compensated outputs in a memory.

Another embodiment of one of the present inventions is a transceiver comprising: a digital block, a transmit chain, a substrate-reactive-coupled (SRC) network, a receive chain and the digital block serially coupled to form a closed loop: a plurality of estimation and/or compensation blocks in the digital block: a stimulus signal from the estimation and/or compensation block applied to the transmit chain; and the estimation and/or compensation block receives a resultant signal from the receive chain within the closed loop and estimating and/or compensating the resultant signal to calibrate the transceiver, further comprising: a processor and a memory; and the memory stores and retrieves all estimated or compensated outputs, whereby the processor applies each the compensated outputs to a corresponding estimation and/or compensation block to fully calibrate the transceiver, whereby a first estimation/compensation block disables all transmit LPFs and DACs; a transmit LO leaks an I/Q sinusoidal signal into the transmit chain; an up-converted I/Q sinusoidal signal coupled into the receive chain by the SRC network: the resultant signal of the receive chain coupled into the first estimation/compensation block; and the first estimation/compensation block compensates an I/Q imbalance of the receive chain, whereby a second estimation/compensation block disables all transmit LPFs and DACs: the second estimation/compensation block adjusts an input DC value and/or internal bias point of all transmit mixers: a transmit LO leaks an I/Q sinusoidal signal into the transmit chain: an up-converted I/Q sinusoidal signal are coupled into the receive chain by the SRC network; and the resultant signal of the receive chain coupled into the second estimation/compensation block, whereby the second estimation/compensation block, compensates the transmit LO leakage. The transceiver further comprising: a third estimation/compensation block enables all transmit LPFs and DACs: the third estimation/compensation block, generates and couples I/Q signals into the transmit chain: up-converted I/Q signals are coupled into the receive chain by the SRC network; and the resultant output of the receive chain coupled into the third estimation/compensation block, whereby the third estimation/compensation block compensates an I/Q imbalance of the transmit chain. The transceiver further comprising: a fourth compensation block generates and couples I/Q signals into the transmit chain: the fourth compensation block adjusts all transmit and receive LPFs to a maximum bandwidth: the fourth compensation block adjusts the transmit or receive LPFs to a cutoff frequency and stores first results from the LPFs into a memory: the fourth compensation block adjusts all LPFs to the maximum bandwidth; and the fourth compensation block, adjusts the other LPFs to the cutoff frequency and stores second results from the LPFs into the memory.

BRIEF DESCRIPTION OF THE DRAWINGS

Please note that the drawings shown in this specification may not necessarily be drawn to scale and the relative dimensions of various elements in the diagrams are depicted schematically. The inventions presented here may be embodied in many different forms and should not be construed as limited to the embodiments set forth herein. Rather, these embodiments are provided so that this disclosure will be through and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 2a illustrates a cross-sectional view of a conventional CMOS die comprising P channels, N channels, n-tubs, p-tubs, epi layer and $p^+$ starting substrate.

FIG. 2b presents the cross-sectional view of the conventional CMOS die illustrating the resistive, resistive-capacitive, capacitive and inductive substrate network coupling the CMOS devices together in accordance with the present invention.

FIG. 4a shows an example filter component in accordance with the present invention.

FIG. 4b illustrates a differential circuit schematic equivalent of FIG. 4a in accordance with the present invention.

FIG. 5a depicts a simple mixer circuit that can be used in accordance with the present invention.

FIG. 5b illustrates a block diagram of a front end of a receiver comprising an LNA, Quad oscillator and mixers to down convert an input signal in accordance with the present invention.

DETAILED DESCRIPTION OF THE INVENTION

Figure 1A:
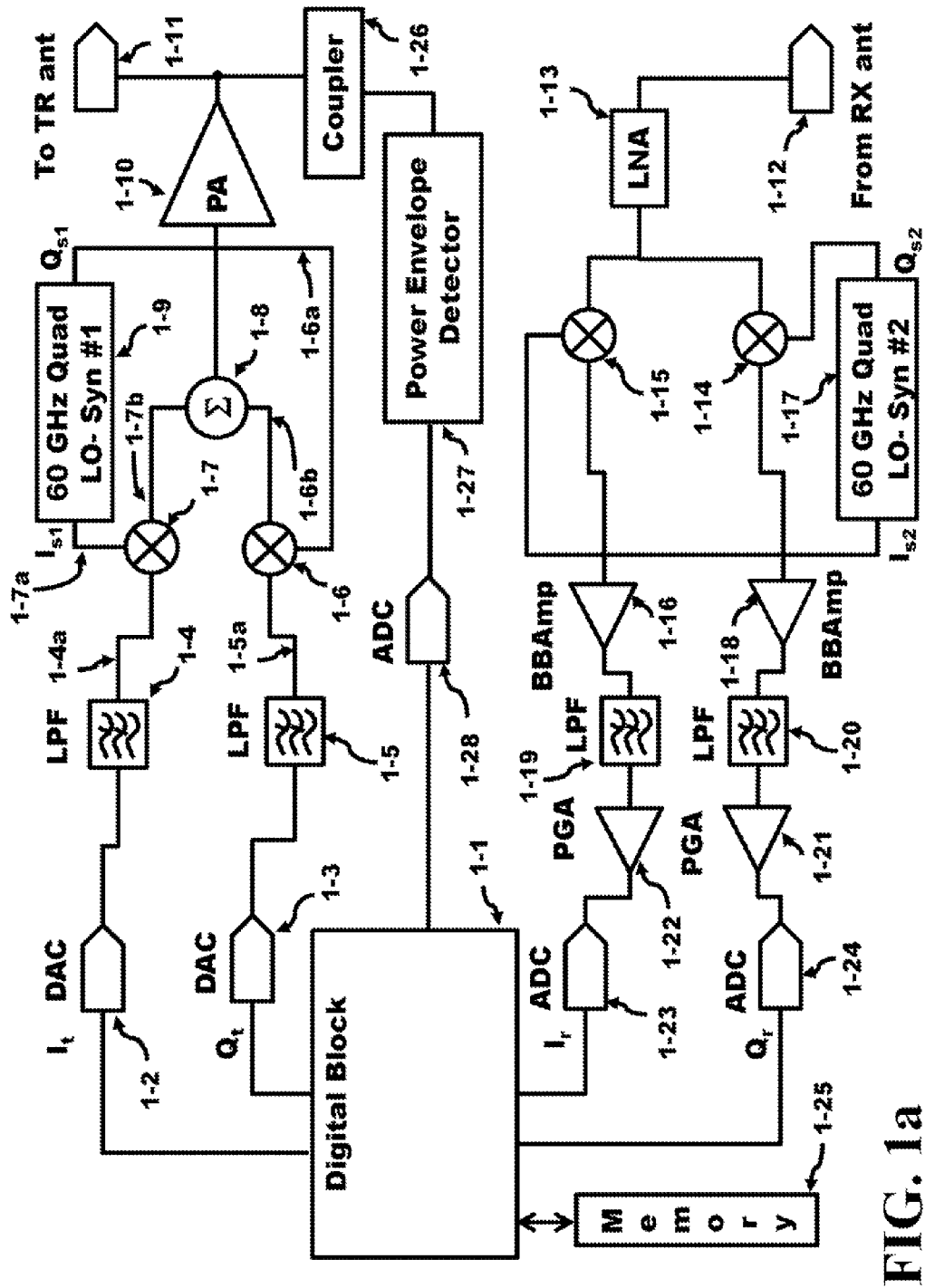
FIG. 1a depicts a Transmit/Receive (TX/RX) chain coupled to a digital block detects the power envelope in accordance with the present invention.

FIG. 1a illustrates a transceiver coupled to a digital block and provides I/Q signals for the RF transmit chain which couples to the transmit antenna 1-11. Starting from the digital block 1-1, the $I_t$ digital signal is applied to the DAC 1-2 input while the $Q_t$ digital signal is applied to the input of DAC 1-3. The I and Q signals after the DAC are analog at this point and, ideally, represent differential signals that are 90° out of phase or orthogonal to each other where the amplitude of both signals are equal. These I and Q signals are then low pass filtered by the LPF 1-4 and LPF 1-5, respectively, to a bandwidth of about 900 MHz. In addition, all single lines coupling (or interconnecting) signals between analog blocks are in fact differential lines, unless noted otherwise. These differential lines are illustrated as a single line to simplify the diagram and when the single line is shown, it is understood that the line and the signal it carries represents a differential signal. A differential signal comprises a first signal and a second signal which is the compliment of the first signal. These two signals are 180° out of phase with each other. For example, interconnect line 1-4a represents a first analog I signal and a second analog I signal which is the compliment of the first analog I signal. The I signal output 1-4a of the LPF 1-4 is up-converted by the mixer 1-7 in conjunction with a signal $I_{s1}$ from a 60 GHz Quad (Quadrature) LO (Local Oscillator)-Syn #1 (Synthesizer) 1-9.

A first 60 GHz Quad LO-Syn 1-9 generates 4 sinusoidal signals (0°, 90°, 180° and 270°) each separated by 90° and each operating at a first frequency near 60 GHz. The first, 0°, and third, 180°, sinusoidal signals ($I_{s1}$) are coupled by the interconnect line 1-7a, are 180° out of phase with each other and are coupled to the mixer 1-7. The mixer 1-7 up-converters the input signal 1-4a onto the output line 1-7b. The up-converted I signal on line 1-7b is applied to the summer 1-8. Meanwhile, the Q signal output 1-5a of the LPF 1-5 is up-converted by the mixer 1-6 in conjunction with a signal $Q_{s1}$ from the 60 GHz Quad LO-Syn 1-9. The second, 90°, and fourth, 270°, sinusoidal signals ($Q_{s1}$) are coupled by the interconnect line 1-6a are 180° out of phase with each other and are coupled to the mixer 1-6. The mixer 1-6 up-converters the input signal 1-5a onto the output line 1-6b. The up-converted Q signal on line 1-6b is also applied to the summer 1-8.

The summer 1-8 adds the I signal 1-7b with the Q signal 1-6b and applies the combined signal to the power amplifier (PA) 1-10. The PA 1-10 presents the amplified signal to the transmit antenna 1-11 and is coupled to the coupler 1-26. The coupler provides a signal to the power envelope detector 1-27 after which the signal is analog-to-digital converted by the ADC 1-28. The digital block analyzes the output signal of the ADC 1-28 and can be used to adjust the power output of the RF transmit chain of the transceiver.

The digital block is also coupled to the output of the receive chain of the transceiver receiving the $I_r$ digital signal and the $Q_r$ digital signal from the ADC 1-23 and the ADC 1-24, respectively. The signal comes in from the receive antenna 1-12 and is applied to the input of the low noise amplifier LNA 1-13. The output of the LNA amplifies the weak signal and applies the signal to the two mixers 1-15 and 1-14. The signal is down-converted to baseband using a second 60 GHz Quad LO-Syn #2 1-17 that generates a second set of 4 sinusoidal signals (0°, 90°, 180° and 270°) each separated by 90° and each operating at a second frequency near 60 GHz. The first and second frequency of the first and second 60 GHz Quad LO-Syn 1-9 and 1-17 are offset from one another by a known frequency. Each of these mixers are driven by the output of a second oscillator, this oscillator is the 60 GHz quad local oscillator synthesized #2 1-17. The output of this synthesizer generates and $I_{s2}$ and $Q_{s2}$ signal that is applied to the mixers 1-15 and 1-14, respectively. The second local oscillator 1-17 can be separately adjusted from the first local oscillator 1-9. The two mixers 1-15 and 1-14 generate and I and Q streams, respectively, that is applied to the BBAmp (BaseBand Amplifier) 1-16 and the BBAmp 1-18. After amplification, the signal is applied to the low pass filters 1-19 and 1-20 to filter out signals greater than 900 MHz. The next step is to apply the signal to the programmable gain amplifier 1-22 and 1-29 after which the signal is analog-to-digital converted by 1-23 and 1-24. The $I_r$ and $Q_r$ signals from these two analog-to-digital converters generate the $I_r$ and $Q_r$ signals that are applied to the digital block 1-1. Coupled to the digital block 1-1 is a memory 1-25 which can be used to store values of the $I_t$ and $Q_t$ signals applied to the RF transmit chain or received from the receive chain of the $I_r$ and $Q_r$ outputs.

Figure 1B:
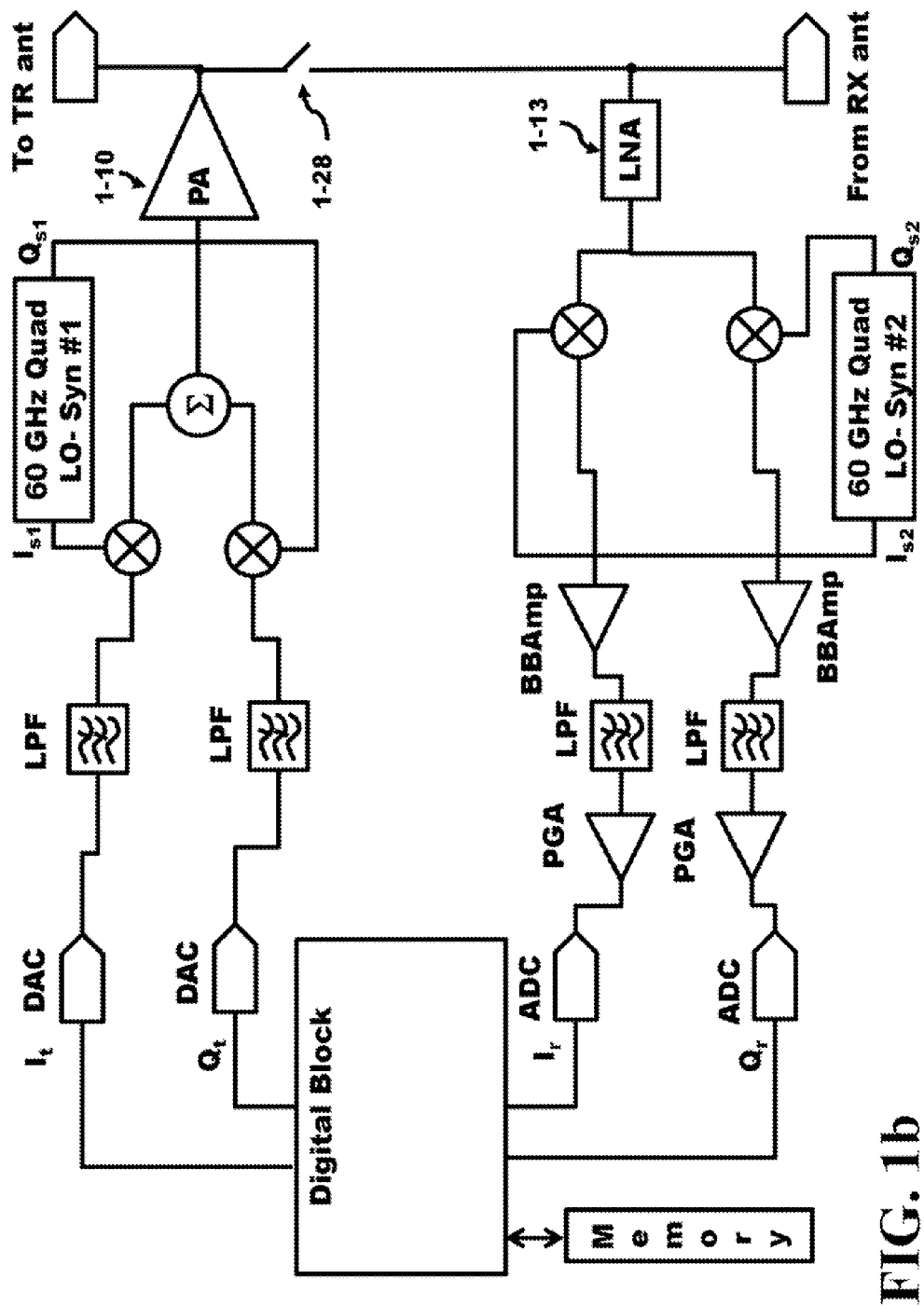
FIG. 1b shows a Transmit/Receive (TX/RX) chain coupling the TX output to the RX input by a switch in accordance with the present invention.

In FIG. 1b, a second version of a transceiver is illustrated. The RF transmit chain is essentially the same until we get to the output of the power amplifier 1-10. At this point a switch 1-28 can connect the power amplifier 1-10 to the low noise amplifier 1-13. As before, the power amplifier can drive its own transmit antenna while the low noise amplifier can respond to the signals from the receive antenna. The receive chain is the same as in FIG. 1a which provides I/Q signals to the digital block. The switch 1-28 is a generalization of the switch that would occur between the transceiver and the antennas. When the switch 1-28 is open the power amplifier 1-10 directly drive the transmit antenna while the receive antenna is used to detect signals and provide them to the low noise amplifier 1-13. When the switch 1-28 is closed the power amplifier although not shown is disconnected from the transmit antenna similarly the receive antenna is disconnected from the low noise amplifier. At this point the power amplifier is provided directly to the low noise amplifier with attenuator in the path to reduce the amplitude. With the switch 1-28 closed, a loop back coupling path is formed between the RF transmit chain and the receive chain allowing the digital block to generate signals for the RF transmit chain. These signal are operated on by the RF transmit chain and applied to the LNA 1-13 of the receive chain.

FIG. 2a depicts a cross-sectional version of a CMOS conventional die. The die is partitioned by the vertical dotted line where everything to the left 2-1 is illustrated as not being metallically coupled to anything to the right of the dotted line 2-2. This provides the definition of isolated; all metallization to the left 2-1 of the dotted line is isolated from all metallization to the right 2-2 of the dotted line. Shown is the $p^+$ substrate 2-6 onto which a layer of p-epi 2-5 is deposited. P-tubs and n-tubs are formed within the p-epi layer. The p-tub 2-4a contains at least one N-channel transistor with an $n^+$ drain region and $n^+$ source region along with a $p^+$ tub-tie biasing the tub. The n-tub 2-3a contains at least one P-channel transistor having a $p^+$ source region and a $p^+$ drain region; however, a n+ tub-tie is typically used to bias the n tub is not illustrated. On the right hand side 2-2 of the dotted line an n-tub 2-3b and a p-tub 2-4b are shown. Within the n-tub 2-3b, there is at least one P-channel device having a $p^+$ source region and a p+ drain region, in addition, an n+ tub-tie to bias the tub is illustrated. Although the p-tub 2-4b contains N-channel transistors, none are depicted; instead a p+ tub-tie is illustrated which is used to bias the tub.

The metallization layer is described using both FIG. 2a and FIG. 2b by starting from the far left. The source p+ source region 2-8a is connected to $VDD_{a1}$. Although the n+ tub-tub is not illustrated, the n+ tub-tie would be used to bias the tub. This P-channel transistor is self-aligned by the p-gate that is coupled to the input signal, $in_a$, and the p+ drain region 2-9a is connected to the n+ drain region 2-10b in the p-tub 2-4a, as well as, the n-gate of the n-channel which is used to self-align the n+ drain region 2-10b from the n+ source region 2-10a. This metal mode is also labeled as the $out_a$ node. The source 2-10a of the N-channel is coupled to the p+ tub-tie 2-11a and connected to $VSS_{a1}$. Moving to the right hand 2-2 side of the dotted line. A second power supply called $VDD_{a2}$, independent from $VDD_{a1}$, is connected to the p+ source region 2-8a of a P-channel device and the n+ tub-tie 2-7. The p-gate self-aligns the drain 2-9a from the source 2-8b in the P-channel transistor. The p-gate is coupled to $in_b$ while the output of the P-channel transistor $out_b$ is generated at the drain 2-9a. Finally, the p+ tub-tie 2-11b in the p-tub 2-4b is coupled to $VSS_{a2}$.

The resistive-capacitive and resistive coupling paths within the body of the substrate are described next. Although the coupling network illustrates one particular mesh configuration, the modeling can be made more or less complicated to suit the needs of the user. A diode exists between opposite polarity doped regions and the diode has a capacitance associated with it. For example, the p+-doped source of the P-channel 2-8a forms a diode capacitance $C_1$ with the n-doped n-tub 2-3a. Similarly, capacitances $C_2$, $C_5$ and $C_6$ have the same type of characteristics. In addition, the n+-doped source of the N-channel 2-10a forms a diode capacitance $C_4$ with the p-doped p-tub 2-4a. Similarly, capacitance $C_3$ has the same characteristics. Finally, a diode forms between the different polarities tubs providing another type of capacitance. The n-doped region of the n-tub 2-3a forms a capacitance $C_8$ with the p-tub 2-4a. Similarly, $C_9$ and $C_7$ have the same type of capacitance.

A resistive network couples all these capacitors together. For example, the source of the P-channel 2-8a is coupled to a capacitor $C_1$ to $R_1$ to $C_2$ of the drain of the transistor. This path can be extended to $R_2$, $C_8$, $R_3$ and $C_3$ to the n+ drain 2-10b of the N-channel in the p-tub 2-4a. Many possibilities exit for the coupling paths and are too extensive to cover all possibilities. For example, $C_1$ to $R_{11}$, to $R_{18}$ and the tub-tie 2-11b. The resistive mesh $R_1$-$R_{18}$ couples the capacitors $C_1$-$C_9$ together. One exception depicts the tub-tie 2-11a coupled to $VSS_{a1}$ being only resistively coupled to the tub-tie 2-11b coupled to $VSS_{a2}$; thus, the VSS tub-ties are only contacts that are resistive coupled to each other while the remaining paths between any other doped region includes at least one reactance in series.

In addition, two additional reactances are illustrated in FIG. 2b: 1) the inductive coupling between $L_{m1}$ 2-12a and $L_{m2}$ 2-12b which can couple signals between the left and right sides and 2) $C_m$. $L_{m1}$ can represent the inductance of a portion of a metallic trace in the left side 2-1 while $L_{m2}$ can represent the inductance of a portion of a metallic trace in the right side 2-2. If one segment carries current, then these two inductances can be magnetically coupled 2-13 and overcoming the initial isolation desired between the left and right portions of the die. This coupling can occur in free space as well as within the substrate. The capacitance $C_m$ is the parasitic capacitance between the adjacent traces of the metallization of $VSS_{a1}$ and those of $VDD_{a2}$. Other capacitive reactance and inductive reactance due to metallic traces can exit between the assumed isolated sides of the die although they are not shown. The first reactance can be the magnetic coupling 2-13 between the mutual-inductance $L_{m1}$ 2-12a of a metal trace in the left side 2-1 to that of the mutual-inductance $L_{m2}$ 2-12b of a metal trace on the right side 2-2.

Figure 3A:
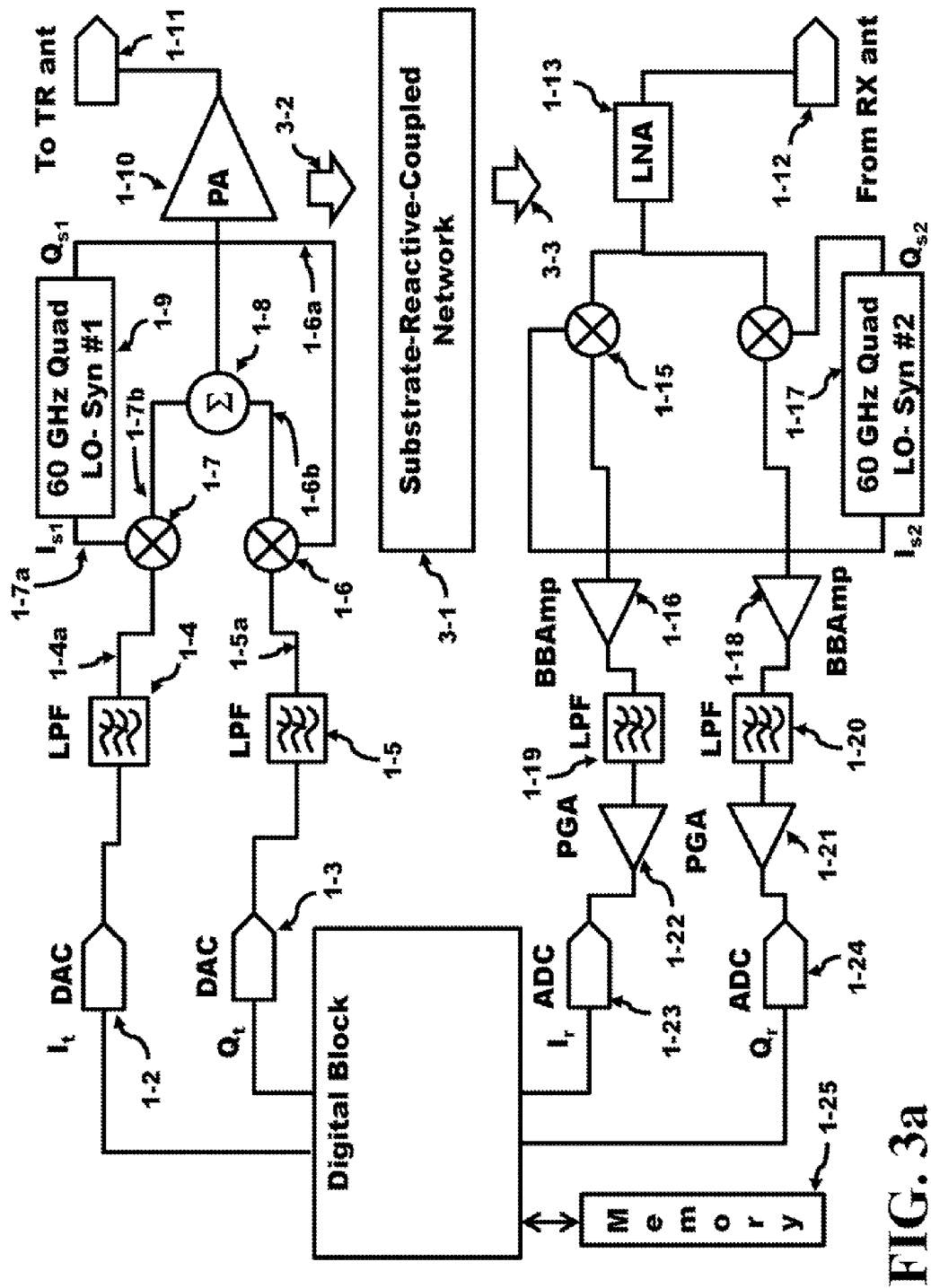
FIG. 3a depicts a Substrate-Reactive-Coupled Network coupling the TX output to the RX input in accordance with the present invention.

FIG. 3a illustrates a transceiver coupled to a digital block and provides I/Q signals for the RF transmit chain which couples to the transmit antenna 1-11. Starting from the digital block 1-1, the $I_t$ digital signal is applied to the DAC 1-2 input while the $Q_t$ digital signal is applied to the input of DAC 1-3. The I and Q signals after the DAC are analog at this point and, ideally, represent signals that are 90° out of phase or orthogonal to each other where the amplitude of both signals are equal. These I and Q signals are then low pass filtered by the LPF 1-4 and LPF 1-5, respectively, to a bandwidth of about 900 MHz. Furthermore, the LPF can provide additional gain to the signal passing through the filter. For an example of a LPF, U.S. patent application Ser. No. 13/243,880, "Differential Source Follower having 6 dB Gain with Applications to WiGig Baseband Filters," cited above, describes a LPF, suitable for filtering a wideband signal and is incorporated herein by reference. In addition, all single lines coupling (or interconnecting) signals between analog blocks are in fact differential lines, unless noted otherwise. The I signal output 1-4a of the LPF 1-4 is up-converted by the mixer 1-7 in conjunction with a signal $I_{s1}$ from a 60 GHz Quad (Quadrature) LO (Local Oscillator)-Syn (Synthesizer) 1-9.

A first 60 GHz Quad LO-Syn 1-9 generates 4 sinusoidal signals (0°, 90°, 180° and 270°) each separated by 90° and each operating at a first frequency in the vicinity of 60 GHz. The first LO 1-9 is can be synthesized to operate over a range of operating frequencies. The first, 0°, and third, 180°, sinusoidal signals ($I_{s1}$) are coupled by the interconnect line 1-7a, are 180° out of phase with each other and are coupled to the mixer 1-7. The mixer 1-7 up-converters the input signal 1-4a onto the output interconnect 1-7b. The up-converted I signal on line 1-7b is applied to the summer 1-8. Meanwhile, the Q signal output 1-5a of the LPF 1-5 is up-converted by the mixer 1-6 in conjunction with a signal $Q_{s1}$ from the 60 GHz Quad LO-Syn 1-9. The second, 90°, and fourth, 270°, sinusoidal signals ($Q_{s1}$) are coupled by the interconnect line 1-6a are 180° out of phase with each other and are coupled to the mixer 1-6. The mixer 1-6 up-converters the input signal 1-5a onto the output line 1-6b. The up-converted Q signal on line 1-6b is also applied to the summer 1-8. The I and Q signal from the LO 1-9 need to maintain the 90° separation and the criteria of equal amplitude over this range of operating frequencies. In FIG. 3, the summer 1-8 adds the I signal 1-7b with the Q signal 1-6b and applies the combined signal to the power amplifier (PA) 1-10. The resistance in the interconnect between the summer 1-8 and the output of the PA 1-10 is a critical feature and needs to be carefully designed. For an example of a reducing the resistance in the PA, U.S. patent application Ser. No. 13/243,986, "Method and Apparatus of Minimizing Extrinsic Parasitic Resistance in 60 GHz Power Amplifier Circuits," cited above, describes a power amplifier, suitable for amplifying and driving an antenna and is incorporated herein by reference.

The PA 1-10 presents the amplified signal to the transmit antenna 1-11 and is also coupled to the receiver chain via the Substrate-Reactive-Coupled (SRC) Network. The coupling of the SRC Network can be either: 1) through the substrate resistance and capacitance of the diodes formed in the substrate between two isolated regions; 2) purely resistive from one isolated VSS to a second isolated VSS (note that the reactive component is missing); 3) capacitively coupled between one metal trace in a first isolated region to a second metal trace in a second isolated region; and 4) magnetically coupled from a first metal trace in a first isolated region to a second metal trace in a second isolated region. The term "isolated" implies that the metallization on the surface of the die of one region is isolated from that of a second region.

A closed loop path is completed between the RF transmit chain and the RF receive chain by the Substrate-Reactive-Coupled (SRC) Network 3-1. Signals are injected from the RF transmit chain into the substrate as illustrated by the arrow 3-2. The SRC Network 3-1 transfers this signal to the receive chain as illustrated by the arrow 3-3. Thus, a closed loop is created: the digital block generates a stream of bits, sends these signals into the RF transmit chain to the antenna 1-11 and in the process also introduces the signal into the RF receive chain via the SRC Network 3-1. Once the receive chain picks up this loopback coupling signal, the receive chain transfers the captured signals back to the digital block. The injected signals that are transferred between the RF transmit chain and the RF receive chain are due to the generated switching noise that is passed through the loopback coupling path. Analog designers typically attempt to minimize any form of noise coupling due to this switching noise using any know means in the art, if possible. However, the inventor has found that the loopback coupling path due to the SRC network coupling the RF transmit chain and RF receive chain on a given die can be used beneficially to minimize the imbalance of a receive chain I/Q signals, to minimize the imbalance of a transmit chain I/Q signal, to minimize the transmit LO leakage, to adjust the cutoff frequency of the transmit chain LPFs, and to adjusting the cutoff frequency of the receive chain LPFs. Furthermore, since this switching noise from the RF transmit chain that is being coupled into the substrate and back into the receiver chain has already been accounted for during the estimation/calibration procedure, the procedure has corrected for this coupling when the transceiver is in the normal operation of the system or fully operational. This is in stark contrast to the prior art where additional circuit elements were required to perform this coupling function. This invention eliminates the need for the additional circuitry saving area, power, and performance.

The digital block is also coupled to the output of the receive chain of the transceiver receiving the resultant signal of the $I_r$ digital signal and the $Q_r$ digital signal from the ADC 1-23 and the ADC 1-24, respectively. The signal comes into the receive chain via the SRC Network and is applied to the input of the LNA 1-13. The output of the LNA amplifies this signal and applies the signal to the two mixers 1-15 and 1-14. The signal is down-converted to baseband using a second 60 GHz Quad LO-Syn 1-17 that generates a second set of 4 sinusoidal signals (0°, 90°, 180° and 270°) each separated by 90° and each operating at a second frequency in the vicinity of 60 GHz. For an example of an LNA coupled to a mixer and Quad Oscillator, U.S. patent application Ser. No. 13/312,806, "Method and Apparatus of an Input Resistance of a Passive Mixer to Broaden the Input Matching Bandwidth of a Common Source/Gate LNA," also cited above, describes a LNA, mixer and Quad Oscillator, suitable for down-converting a received signal and is incorporated herein by reference. The first and second frequency of the first and second 60 GHz Quad LO-Syn 1-9 and 1-17 are offset from one another by a known frequency and both can be adjusted in frequency independent of the other. Each of these mixers 1-15 and 1-17 are driven by the output of the second oscillator, this oscillator is the second synthesized 60 GHz quad LO-Syn 1-17. The output of this synthesizer generates and $I_{s2}$ and $Q_{s2}$ signal that is applied to the mixers 1-15 and 1-14, respectively. The second local oscillator 1-17 can be separately adjusted from the first local oscillator 1-9. The two mixers 1-15 and 1-14 down-convert the signal from the LNA 1-13 and generate and I and Q streams, respectively, that is applied to the BBAmp (Base-Band Amplifier) 1-16 and the BBAmp 1-18. After amplification, the signal is applied to the LPFs 1-19 and 1-20 to filter out signals greater than 900 MHz to avoid anti-aliasing issues. The next step is to apply the signal to the programmable gain amplifier 1-22 and 1-29 after which the signal is analog-to-digital converted by 1-23 and 1-24. The $I_r$ and $Q_r$ signals from these two analog-to-digital converters generate the $I_r$ and $Q_r$ signals that are applied to the digital block 1-1. Coupled to the digital block 1-1 is a memory 1-25 which can be used to store values of the $I_t$ and $Q_t$ signals being applied to the RF transmit chain or resultant signal received from the receive chain at the $I_r$ and $Q_r$ outputs.

Figure 3B:
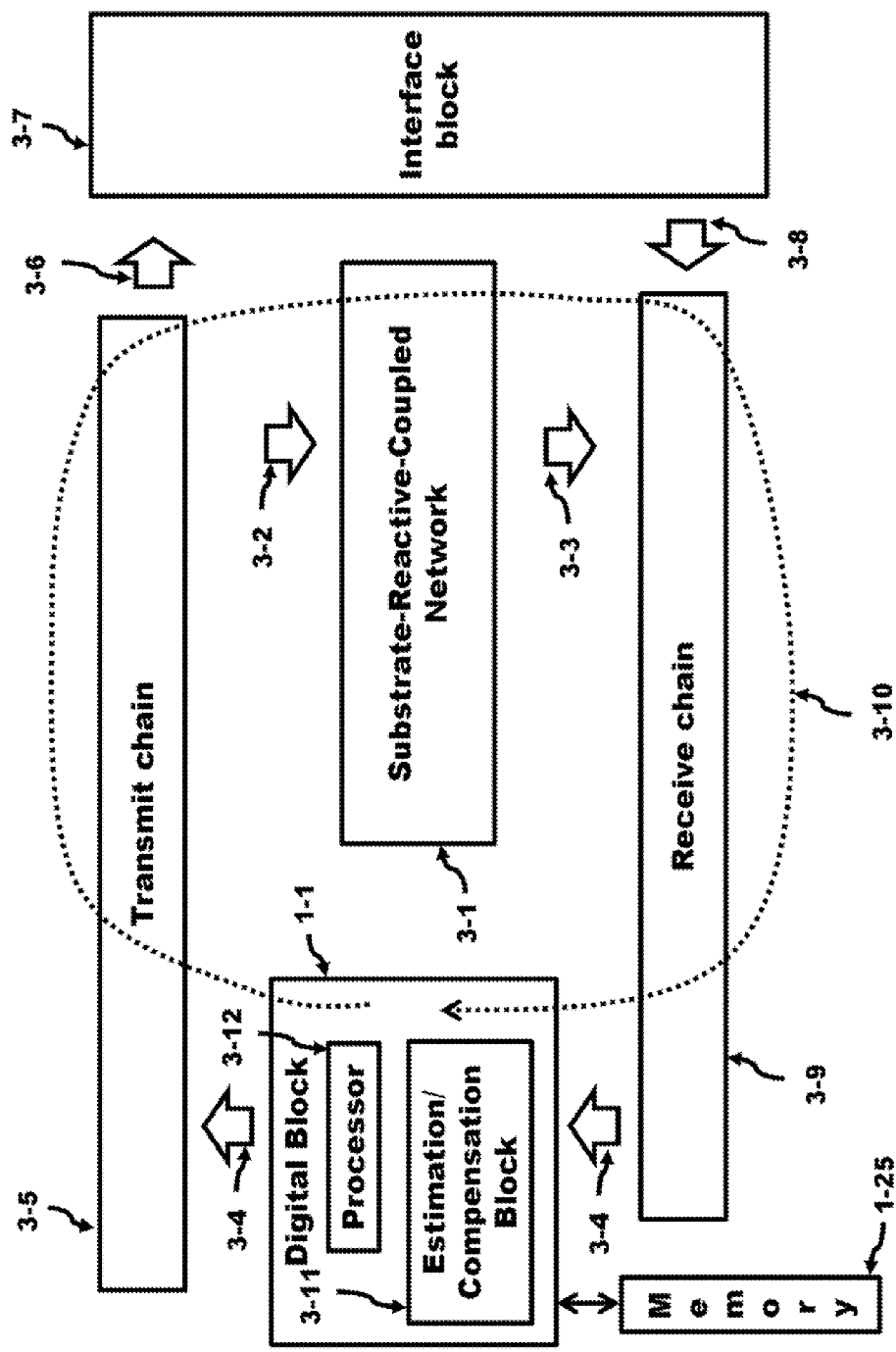
FIG. 3b illustrates a block diagram of the closed loop path comprising a digital block, a transmit chain, a SRC network forming the loopback coupling path, a receive chain, coupling back to the digital block in accordance with the present invention.

A Block diagram representation of the invention is illustrated in FIG. 3b. The digital block 1-1 comprises a processor 3-12 and at least one estimation and/or compensation block 3-11 that generates and couples 3-4 at least one signal to the transmit chain 3-5. This signal can either be a control signal or digital I/Q signal. If the signal is a control signal, then the RF I/Q signal is leaked into the receive chain by the mixers from the LO. Otherwise, the RF I/Q signals provided by the digital block can be corrected for imbalance by the estimation and/or compensation block. The transmit chain 3-5 couples 3-2 the signal to the Substrate-Reactive-Coupled network 3-1. The signal can also be coupled 3-6 to an interface block 3-7. The interface block 3-7 can comprise antennae, transformers, transmission line entry points, etc. These are the components that communicate to/from other transceivers in the communication system. The interface block 3-7 also couples 3-8 the other transceivers to the receive chain 3-9. The Substrate-Reactive-Coupled network 3-1 couples 3-3 the signal received from the transmit chain 3-5 to the receive chain 3-9. The receive chain 3-9 couples 3-4 the resultant signal to the digital block 1-1 where the processor 3-12 and estimation/compensation block 3-11 operates on the signal received from the receive chain 3-9. Note that this is a closed loop 3-10 as indicated by the dotted circle. The processor 3-12 instructs the memory 1-25 to store and retrieve all estimated or compensated signals The estimation/compensation can be used to correct any new signals being applied to the transmit chain 3-5 by referring to the estimation stored in memory. The interface block 3-7 can also be disconnected from the closed loop, if desired.

For an example of a filter, U.S. patent application Ser. No. 13/243,880, filed Sep. 23, 2011, "Differential Source Follower having 6 dB Gain with Applications to WiGig Baseband Filters," cited above, describes balanced filter that provides gain and is incorporated herein by reference. FIG. 4a and FIG. 4b both illustrate a Sallen-Key filter 4-1. The capacitance $C_3$ couples the input signal $V'_{outf}$ to the output signal $V_{outf}$ while the impedances $R_2$ and $C_4$ form a voltage divider between $V'_{outf}$ and GRD (or VSS) generating $V_{in}$. The operational amplifier requires both an input signal $V_{in}$ 4-4 and its complement $\overline{V_{in}}$ 4-5.

By comparing the equivalent Sallen-Key filter 4-1 depicted in FIG. 4a with the circuit 4-3 in FIG. 4b illustrates that the operational amplifier 4-2 in FIG. 4a can be substituted by the RC networks of $C_{n1}$-$R_{n1}$ and $C_{n2}$-$R_{n2}$ along with the devices $N_1$ and $N_2$ in FIG. 4b. The reason for the substitution is that the output and input impedances of the operational amplifier and the RC networks of $C_{n1}$-$R_{n1}$ and $C_{n2}$-$R_{n2}$ along with the devices $N_1$ and $N_2$ have similar characteristics. Both have a high input impedance and a low output impedance. Furthermore, due to the current mirror formed by $N_3$ and $N_1$, the reference current $I_{bias}$ adjusts the current flow in $N_1$. In turn, the output impedance $Z_5$ or $$\frac{1}{g_m}$$

can be altered by adjusting the current flow through the two series coupled devices $N_1$ and $N_2$.

Several example circuits from U.S. patent application Ser. No. 13/312,806, "Method and Apparatus of an Input Resistance of a Passive Mixer to Broaden the Input Matching Bandwidth of a Common Source/Gate LNA," also cited above, is provided. A Gilbert mixer is illustrated in FIG. 5a comprising of the two devices $M_{g1}$ and $M_{g2}$ which are switched by the $rf_{in}$ and $\overline{rf}_{in}$ signals, respectively. The drain of device $M_{g1}$ is coupled to the common node 5-1 of the first mixer switch gated by the in-phase clock ($\Theta_I$ and its compliment). The drain of device $M_{g2}$ is coupled to the common node 5-2 of the second mixer switch gated by the in-phase clock ($\Theta_I$ and its compliment). The outputs of the first mixer switch are combined with the outputs of the second mixer switch as illustrated to generate the if$_{Iout}$, signal. A load attached to each of the two outputs couples the Gilbert mixer to a power supply to supply energy to the circuit. The intermediate frequency contains the sum and difference frequency spectrum between the output signal spectrum carried by the $rf_{in}$ and $\overline{rf}_{in}$ and the in-phase clock ($\Theta_I$ and its compliment). A similar circuit is used to generate the if$_{Qout}$, signal except that the mixer switches are clocked by the quadrature clock ($\Theta_Q$ and its compliment). A quadrature clock is shifted 90° degrees from the in-phase clock.

FIG. 5b illustrates a block diagram of one embodiment of the front end receiver. A quadrature oscillator generates four equally displaced clock phases: $\Theta_I, \overline{\Theta}_I, \Theta_Q$ and $\overline{\Theta}_Q$ at 0°, 180°, 90° and 270°, respectively. The clocks $\Theta_I$ and $\overline{\Theta}_I$ are the in-phase and inverse in-phase clocks while the $\Theta_Q$ and $\overline{\Theta}_Q$ are known as the quadrature and inverse quadrature clocks. The load on each of these clock nodes is identical insuring that the clock output is evenly loaded, thereby preventing any skew between these clock signals from developing helping to prevent an I/Q imbalance. The LNA outputs are applied to common nodes 5-3 and 5-4 of the upper and lower mixer switches. The LNA feeds the amplified signal from a source (loopback coupling or antenna) through the LNA to the coupling capacitor $C_{coup}$. The capacitor $C_{coup}$ couples the output signal of the LNA to the common nodes 5-3 and 5-4 of the two mixer switches. Since the upper mixer switch is clocked by the in-phase clocks, only the in-phase current component $I_I$ is converted into if$_{Iout}$ and since the lower mixer switch is clocked by the quadrature-phase clocks, only the quadrature-phase current component $I_Q$ is converted into if$_{Qout}$.

Figure 6A:
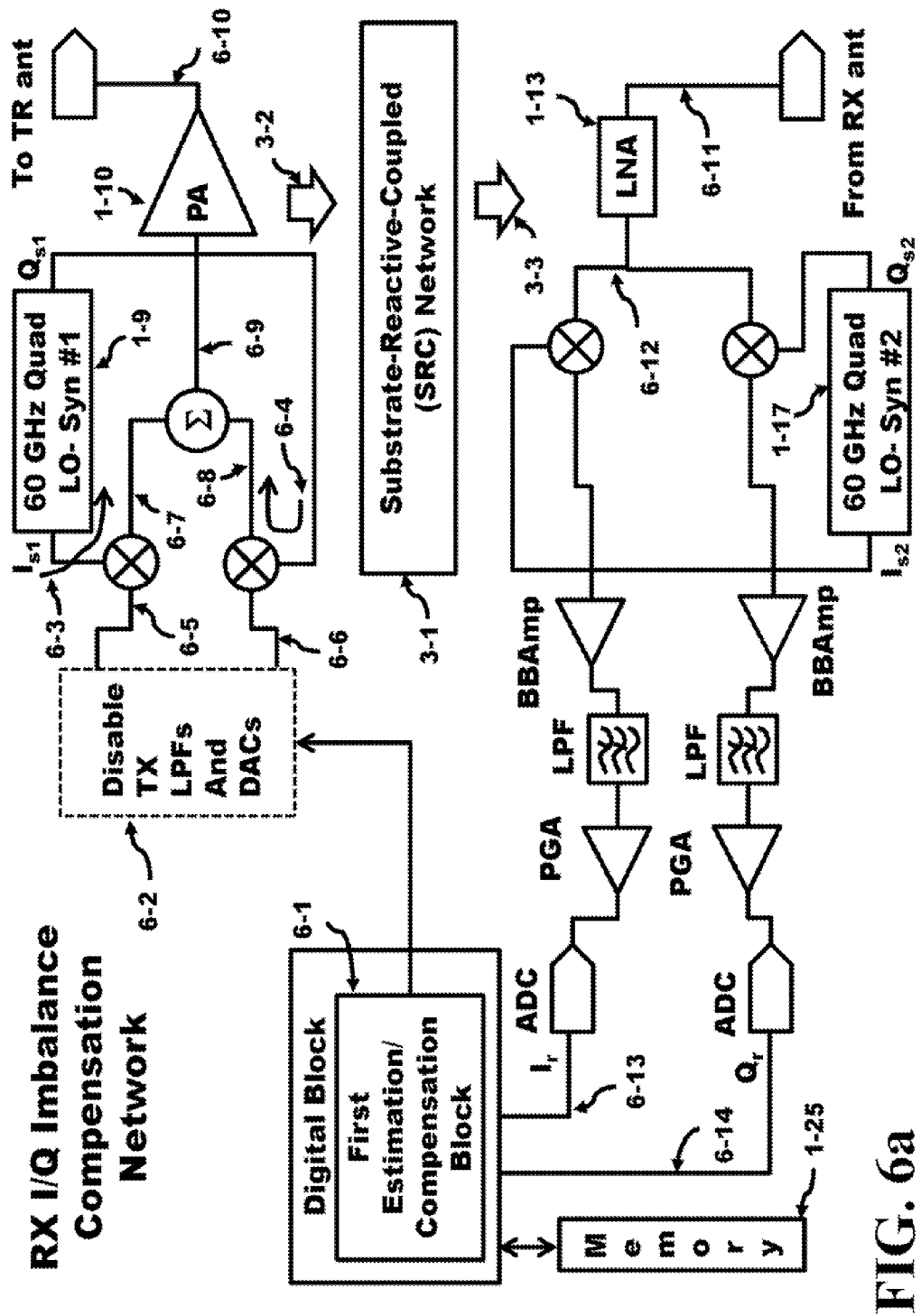
FIG. 6a depicts closed loop path comprising a First Estimation/Compensation Block used to calibrate the I/Q signals in accordance with the present invention.

FIG. 6a depicts the RX I/Q Imbalance Compensation Network. Note that the SRC Network 3-1 completes the closed loop path, as it does, for the remaining diagrams of FIG. 7 through FIG. 10. The First Estimation/Compensation Block 6-1 is embedded within the digital block and operates in conjunction with the processor (not illustrated) and memory 1-25. The processor could be a CPU (Central Processing Unit) microprocessor with either single core or multi-core, a DSP (Digital Signal Processor), or a RISC (Reduced Instruction Set Computer). After a cold start (the die being just powered), the BIOS (Basic Input Output System) software is read from ROM (Read Only Memory) and initials the transceiver. Then, the digital block performs the first estimation/calibration step. The processor cause the First Estimation/Compensation Block to issue a stimulus signal to disable the LPFs and DACs 6-2 in the RF transmit chain. Since both of the outputs 6-5 and 6-6 of the disabled LPF should be 0, the output of the mixers should also be 0; however, due to a DC offset, the 60 GHz LO 1-9 leaks some signal through the mixers. These are represented by the leakage signal 6-3 from the $I_{s1}$ output to the output 6-7 of the top mixer and the leakage signal 6-4 from the $Q_{s1}$ output to the output 6-8 of the bottom mixer of the LO 1-9. The summer adds the outputs 6-7 and 6-8 to generate a sinusoidal 6-9 and applies the sinusoidal signal to the PA 1-10. The LNA 1-13 must operate with an input signal as low as −85 dbm, the leakage from the PA 1-10 is about −25 dbm. Thus, the leakage signal from the LO can be considered a test signal which can be used to reduce the imbalance of the I/Q signals in the RX or receive chain of the transceiver. Experiments have demonstrated that the PA 1-10 can be disabled, and the pre-drive of the PA 1-10 can still provide enough leakage signal to the LNA 1-13 to perform the I/Q imbalance estimation/compensation in the receive chain.

Once the LNA 1-13 amplifies the coupled signal from the SRC Network, the second LO 1-17 down-converters the signal to baseband, the BBAMPs amplify the signal while the LPF band limits the I and Q signals to about 900 MHz, and the PGA provide a variable gain to insure that the ADC's are not overdriven. The ADC's generate the digital $I_r$ 6-13 and $Q_r$ 6-14 resultant signals that are applied to the digital block. The processor inside the digital block alters their frequency of the LO 1-17 to generate a frequency sweep to estimate the I/Q imbalance in the RX chain. The estimated values are stored in the memory 1-25. The processor then performs a compensation using the values stored in memory to correct the I/Q imbalance within the RX chain over the range of frequencies. The processor does so repetitively until the I/Q imbalance is minimized. These new compensated values that are required to compensate the receive chain are also stored in the memory. The processor then adjusts the received I/Q resultant signals arriving at the digital block when the system is fully operational to extract the appropriate data.

Figure 6B:
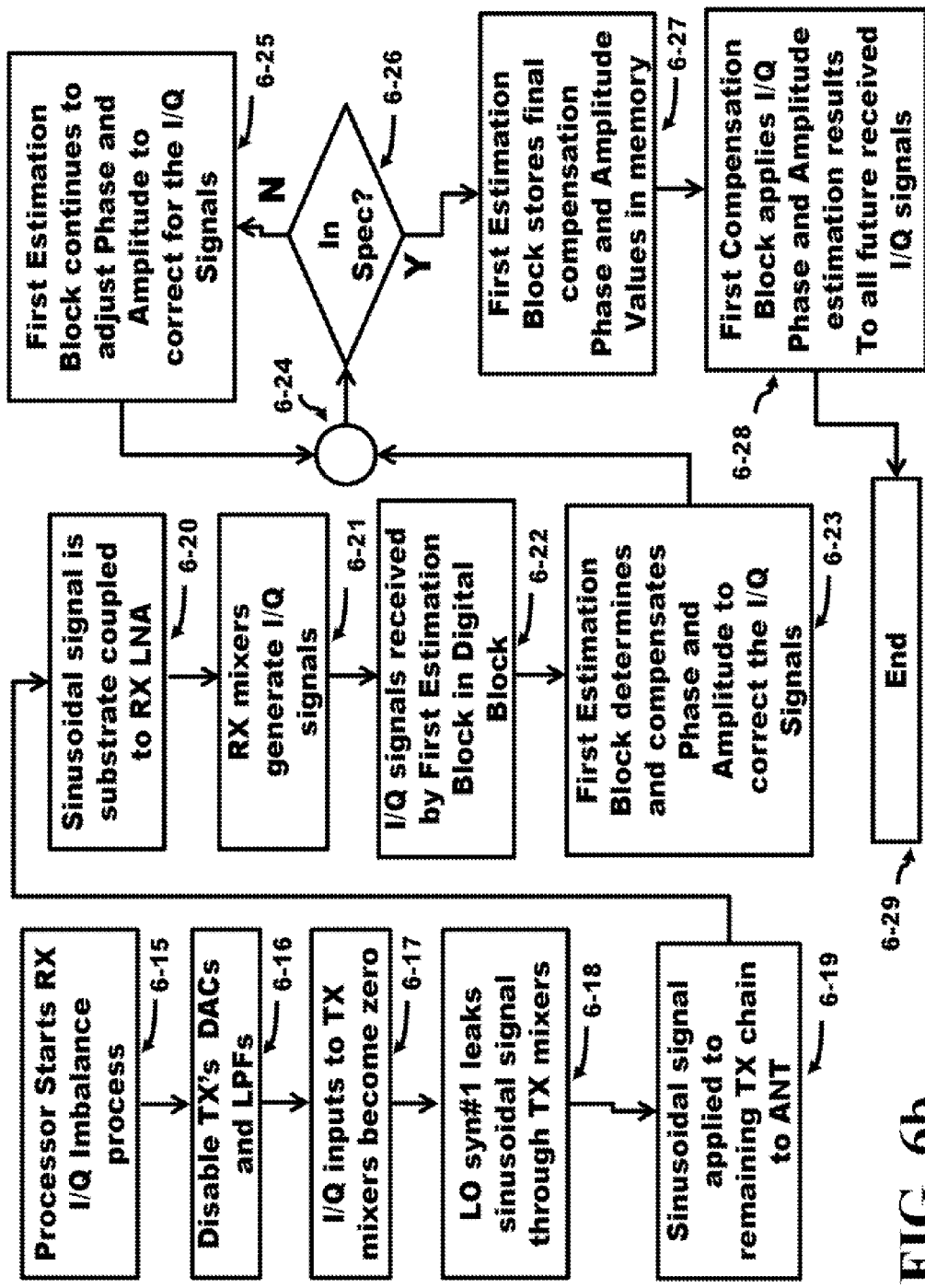
FIG. 6b shows a flow chart providing the First Estimation/Compensation steps used to address the RX I/Q imbalance of the closed loop path shown in FIG. 6a in accordance with the present invention.

FIG. 6b provides a flow chart illustrating the RX I/Q Imbalance Compensation process. In block 6-15, the processor starts the received I/Q imbalance process. The first step for the processor is to disable the transceivers DACs and LPFs as illustrated in block 6-16. The I/Q inputs to the transceiver mixers should become zero as illustrated in 6-17 however due to imbalances signal leaks from the sinusoidal local oscillator through the transceiver mixers as shown in 6-18. The sinusoidal signals are combined in the summer which applies the summed signal to the remaining RF transmit chain towards the antenna as shown in 6-19. The power amplifier which is enabled introduces the sinusoidal signal into the substrate by the feedback path of the SRC network to the receiver chain being intercepted by the LNA as depicted in 6-20. The next step is for the receiver mixers to down-convert and to generate the I/Q receiver signals as shown in 6-21. After the I/Q signals pass through the receiver chain they make their way to the first estimation block in the digital block depicted by 6-22. The first estimation block estimates then uses these results to determine and compensate for phase and amplitude differences to correct for the RX I/Q signal imbalance as shown in 6-23. Next, the bubble 6-24 which goes to the decision block 6-26 requests to see if the receiver I/Q signals are corrected and within spec. If they are not within spec, then as illustrated in 6-25, the first estimate block continues to adjust the phase and amplitude to correct for the I/Q signals. This continues in the loop 6-25, 6-24 and 6-26 until the decision block 6-26 determines that the receive I/Q signals are within spec. At this point, the first estimation block stores the final compensation phase and amplitude values in memory as depicted in 6-27. And from there on, the first compensation block applies the I/Q phase and amplitude estimation results to all future received I/Q signals ending 6-29 the process.

Figure 7A:
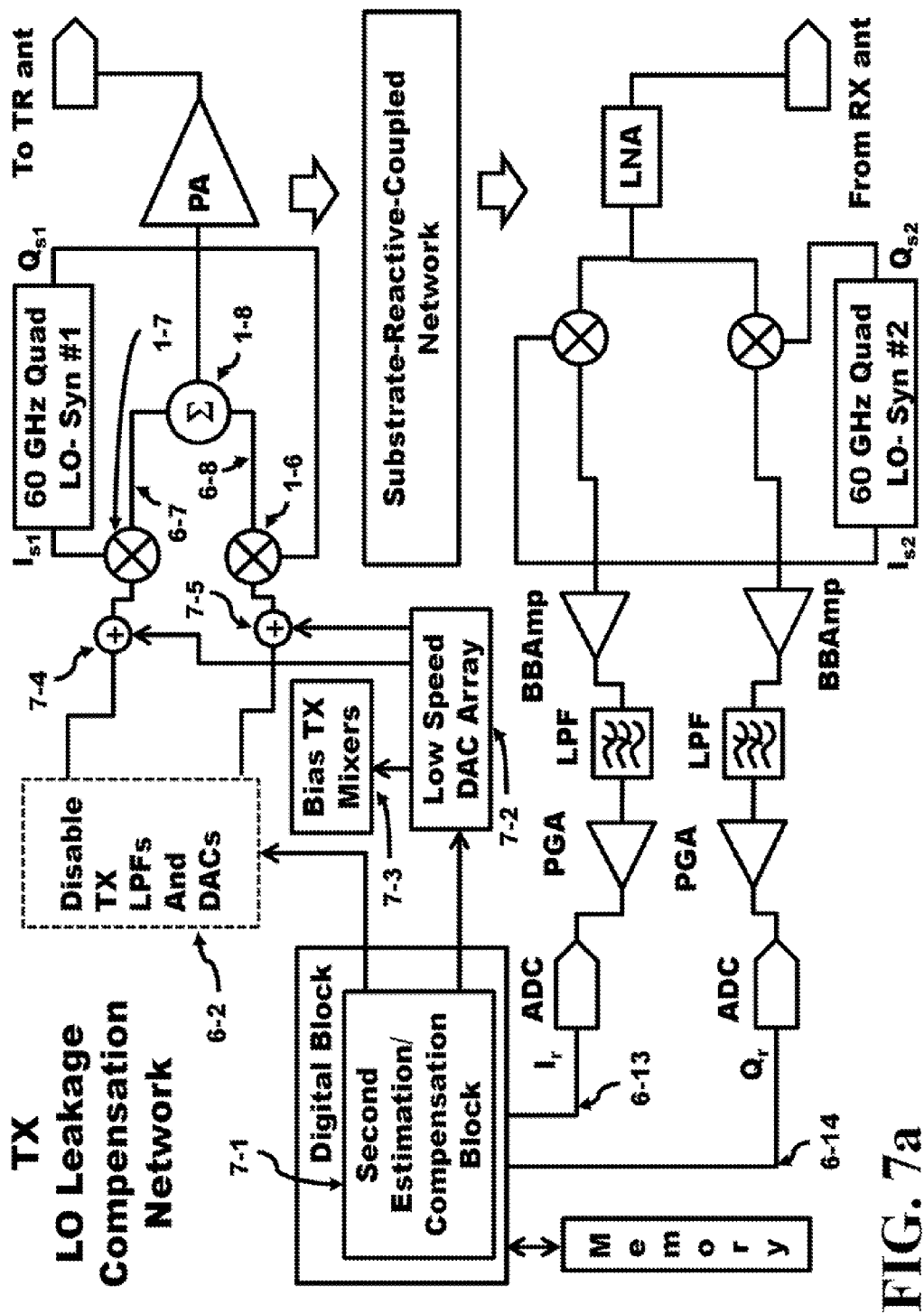
FIG. 7a illustrates an SRC network coupled closed loop path comprising a Second Estimation/Compensation Block used to calibrate the TX LO leakage in accordance with the present invention.

FIG. 7*a* illustrates the block diagram of the TX LO Leakage Compensation Network. This network is composed of a number of blocks similar to the case depicted in FIG. 6*a*. The exception is that a second estimation compensation block 7-1 is used within the digital block and it controls a low-speed DAC array 7-2. The output of the low-speed DAC array generates control stimulus signals that adjust the voltages to the adders of 7-4 and 7-5. In addition, a block 7-3 adjusts the bias of the transmit mixers 1-6 and 1-7. The transmit LPFs and DACs are still disabled as illustrated in block 6-2. Now the DC offset is applied to the input to the mixers 1-6 and 1-7 and is controlled by the DC voltage stimulus generated in the low speed DAC 7-2 and summed in the adders positioned at 7-4 and 7-5. The leakage signal of the two inputs 6-7 and 6-8 of the mixers are applied to the summer 1-8. The summer 1-8 applies to signal to the power amplifier which couples the signal to the low noise amplifier through the SRC network to the receiver chain which was previously compensated for in the first estimation compensation step. After passing through the receive chain the $I_r$ 6-13 and $Q_r$ 6-14 resultant signals are applied back to the second estimation compensation block to adjust the values of the low-speed DAC array 7-2. This process is performed till the TX LO Leakage Compensation Network minimizes the I/Q signal imbalance of the transmit side. Note again that the RF transmit chain is coupled to the receive chain through the SRC network of the die.

Figure 7B:
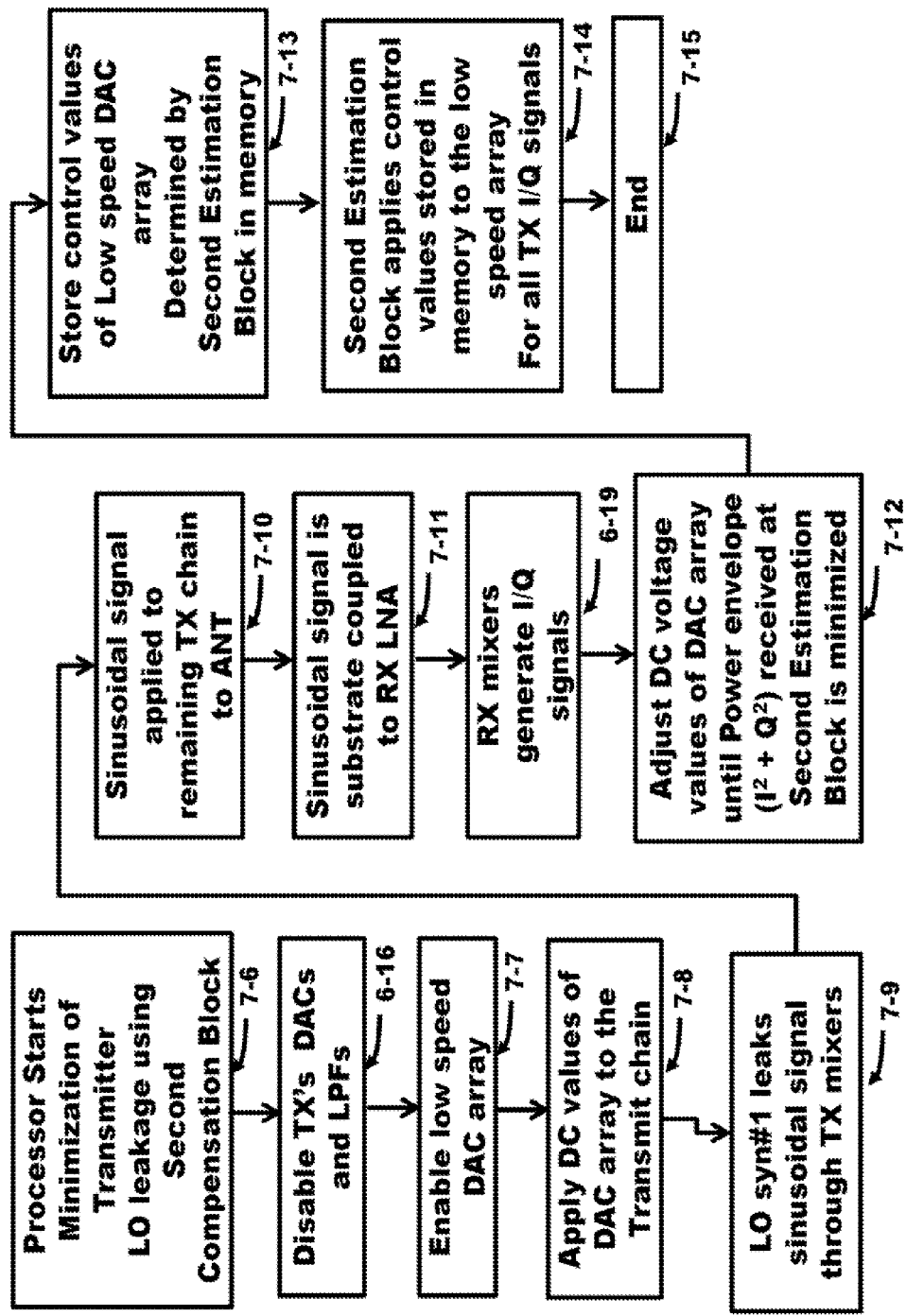
FIG. 7b presents a flow chart providing the Second Estimation/Compensation steps used to address the TX LO leakage of the closed loop path shown in FIG. 7a in accordance with the present invention.

A second flowchart in FIG. 7*b* illustrates how the TX LO Leakage Compensated process behaves. Once again, the processor starts the minimization of transmit local oscillator leakage using a second compensated block as depicted in 7-6. As in the very first flowchart, the transmitters DACs and LPFs are disabled as indicated in block 6-16. The next step as illustrated in 7-7 is to enable the low-speed DAC array, then the processor adjusts the DC value of the DAC array to various DC values in the RF transmit chain as shown in 7-8. As before, the local oscillator of the transmitter leaks sinusoidal signals through the TX mixers as illustrated in 7-9. The sinusoidal signal is applied to the remaining RF transmit chain towards the antenna as depicted in box 7-10. The signal from the output of the power amplifier which is a sinusoidal signal is coupled through the SRC network to the receiver chain starting with the LNA as illustrated by the block 7-11. The receiver mixers generate the IQ signals, see 6-19, and are applied to the second estimation compensation block. The processor then iteratively adjusts the DC voltage values of the DAC array based on the power envelope ($I^2$ plus $Q^2$) received at the second estimation block and is minimized as depicted in block 7-12. Once the power envelope is minimized, the control values determined by the second estimation block of the low-speed DAC are stored in memory as shown in 7-13. The second estimation block then applies to control values stored in memory to the low-speed DAC array for all transmit I/Q signals into the future as presented in 7-14. Besides adjusting the DC values of the inputs to the mixer, the DAC array also provides DC voltage to bias the mixers themselves. Once this estimation compensation is completed, the process is ended 7-15.

Figure 8A:
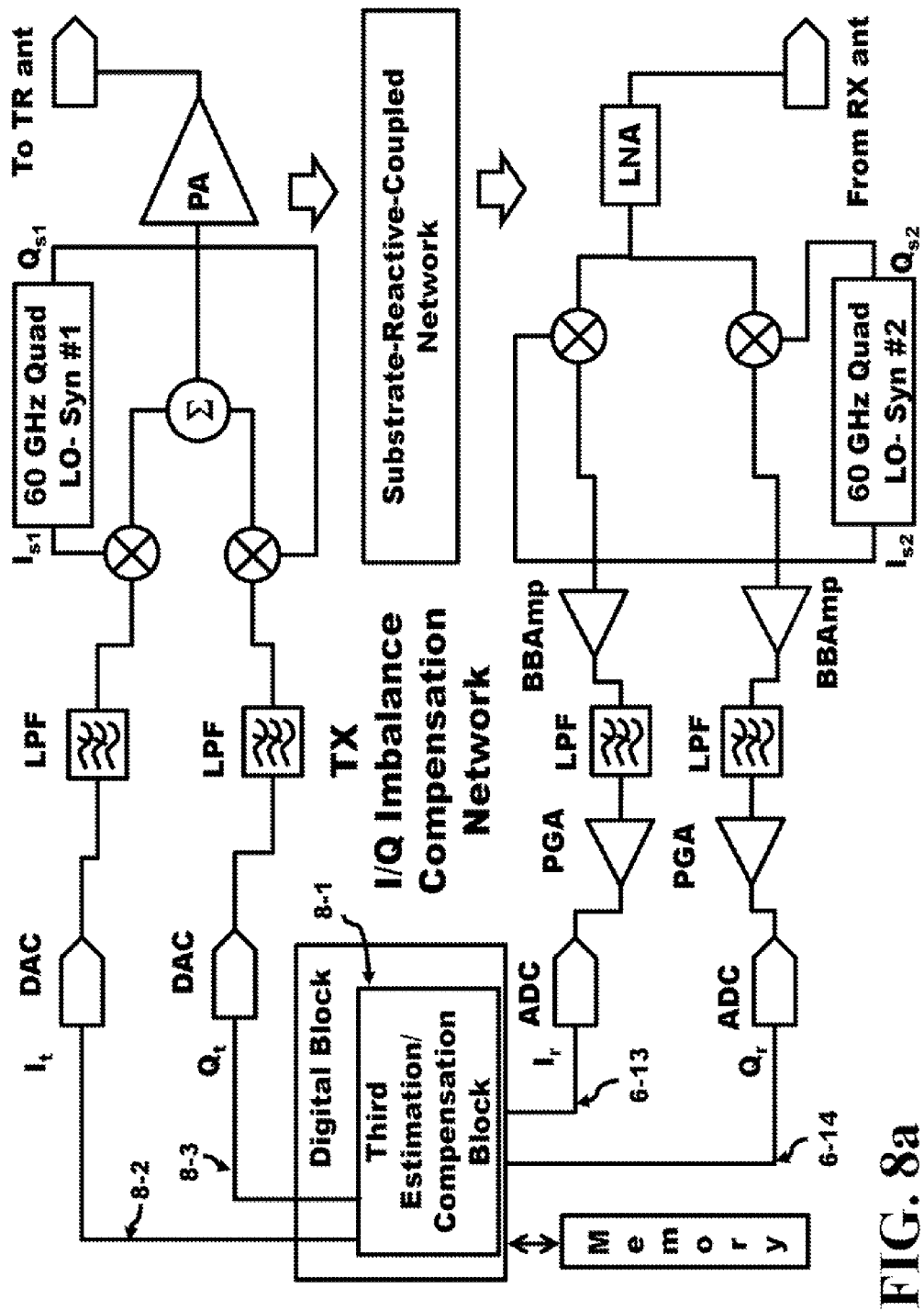
FIG. 8a shows an SRC network closed loop path comprising a Third Estimation/Compensation Block used to calibrate TX I/Q imbalance in accordance with the present invention.

FIG. 8*a* illustrates the TX I/Q Imbalance Compensation Network where this time a third estimation/compensated block 8-1 is configured or used in the digital block. The third estimation block generates $I_t$ 8-2 and $Q_t$ 8-3 stimulus signals at the output of the digital block, note that the DACs and LPFs in the RF transmit chain have been enabled. Now, the full RF transmit chain is evaluated for the I/Q signal imbalance compensation. The substrate couples to signal from the power amplifier into the LNA of the receive chain using the SRC network completing the feedback path and returns these resultant signals back to the third estimation compensation block 8-1 using the output digital leads 6-13 for $I_r$ and 6-14 for $Q_r$. Once this has been estimated, the process continues iteratively until the compensation is complete and has been compensated. At this point, the results of the final compensation results are stored into the memory to be used to allow the RF transmit chain to balance the I/Q signals imbalance network.

Figure 8B:
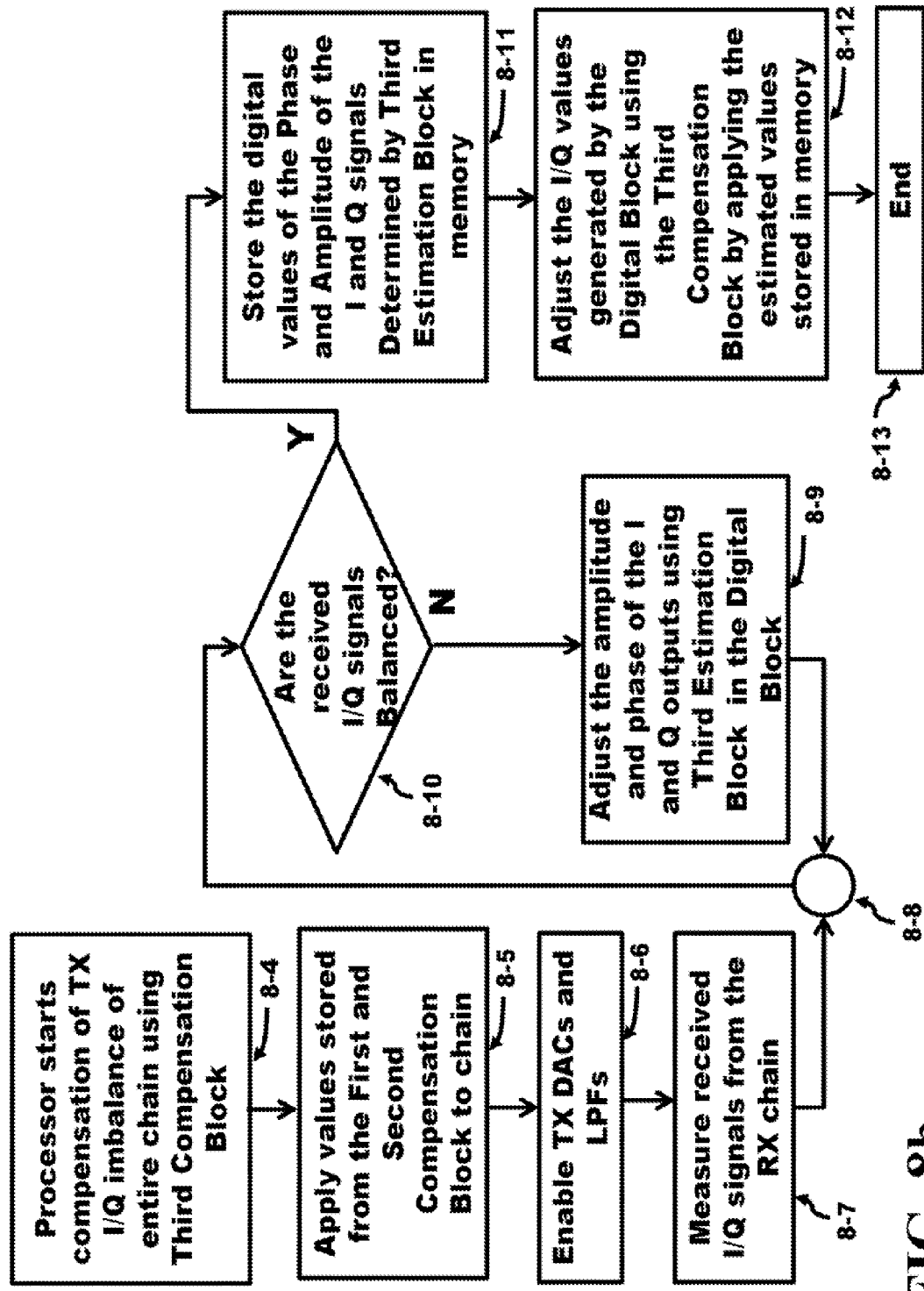
FIG. 8b illustrates a flow chart providing the Third Estimation/Compensation steps used to address the TX I/Q imbalance of the closed loop path shown in FIG. 8a in accordance with the present invention.

FIG. 8*b* illustrates the control flow for the TX I/Q Imbalance Compensation step. A third estimation compensation block within the digital block is used to complete the RF transmit chain I/O imbalance compensation. As before, the processor starts the compensation of the RF transmit chain for I/Q imbalance of the entire RF transmit chain using the third compensation block as depicted in box 8-4. All of the values from memory for the first and second compensation blocks to the RF transmit and receive chains are applied as illustrated in block 8-5. The transmitter DACs and LPFs are enabled illustrated by 8-6. The I/Q signals make their way through the RF transmit chain, through the coupling of the substrate via the SRC network, and through the received chain back to the digital block, as illustrated in 8-7. In bubble 8-8, the process moves to the decision block 8-10 requesting if the received I/Q signals are compensated or balanced. If they are not, adjust the amplitude and phase of the I/Q outputs from the digital block using the third estimation block within the digital block, see 8-9. Continue this loop, until the decision block determines that the I/Q signals are compensated then move into block 8-11. The digital values of the phase and amplitude of the I and Q signals determined by the third estimation block are stored into memory. Then, adjust the I/Q values generated by the digital block using the third compensation block by applying the estimated value stored in memory to adjust the generated I/Q signals as indicated in block 8-12. At this point the third estimation/compensation process has ended 8-13.

Figure 9A:
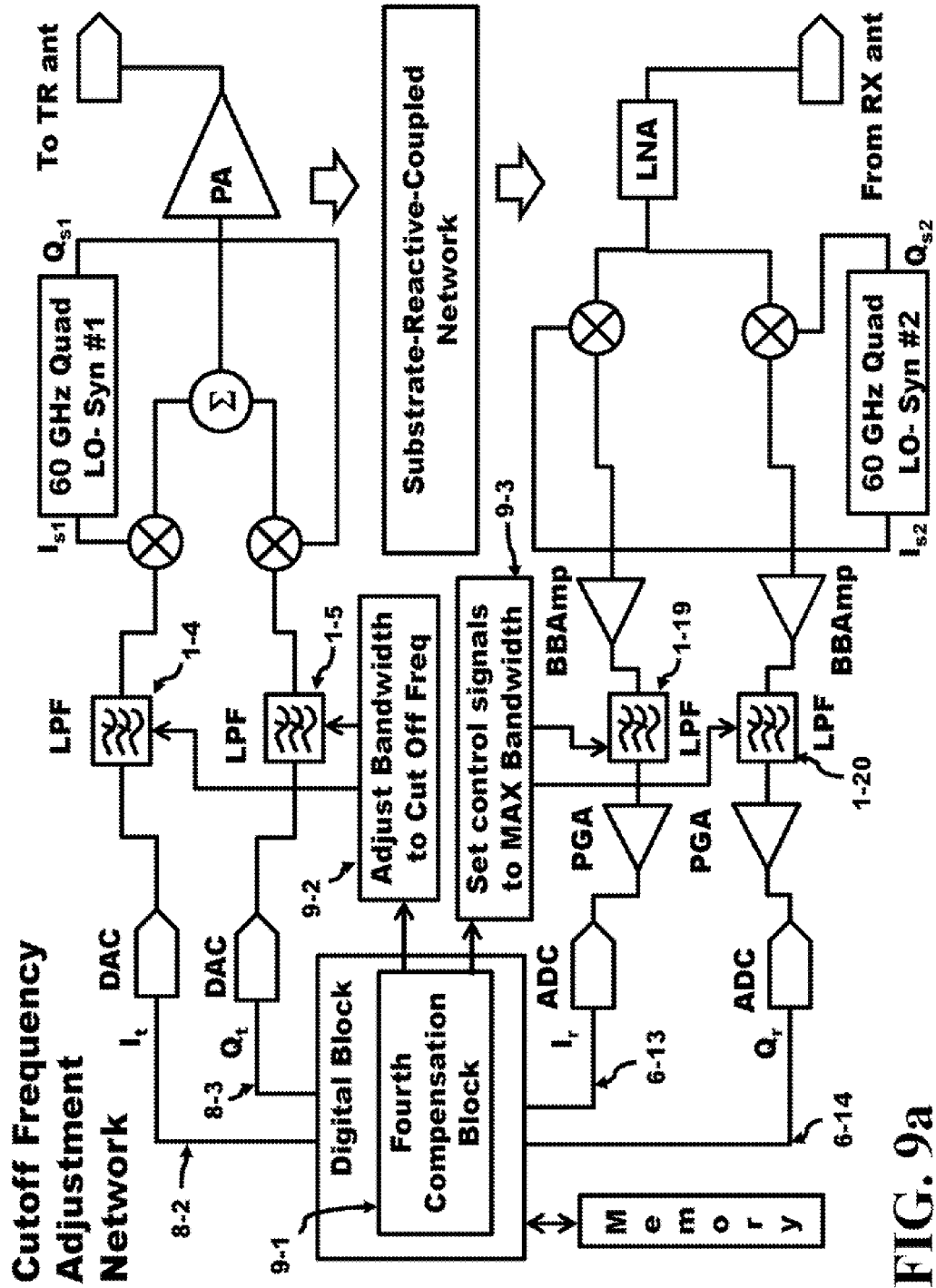
FIG. 9a depicts an SRC network closed loop path comprising a Fourth Compensation Block used to adjust the cut off bandwidth of one set of LPFs in accordance with the present invention.
Figure 9B:
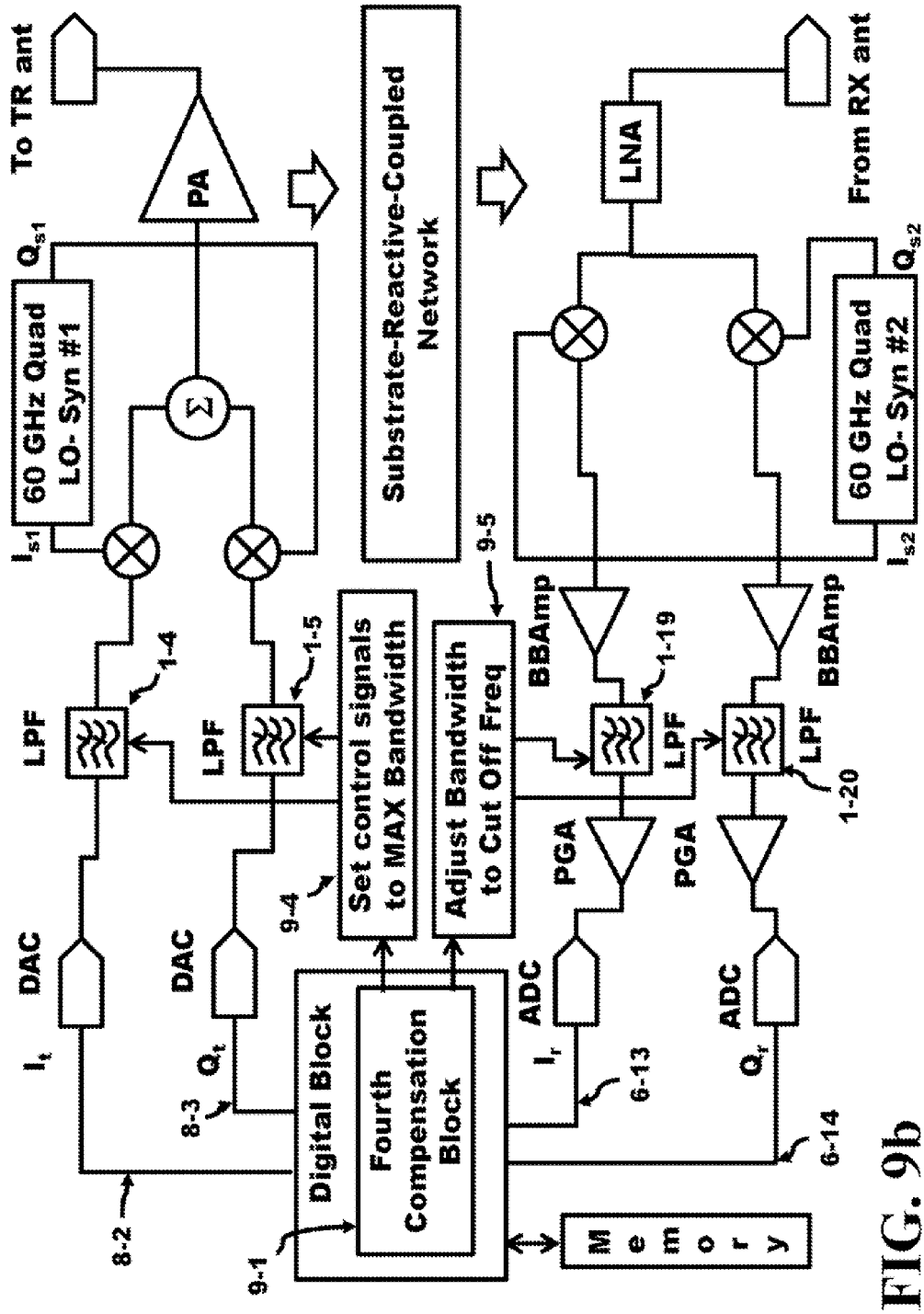
FIG. 9b depicts an SRC network closed loop path comprising a Fourth Compensation Block used to adjust the cut off bandwidth of the other set of LPFs in accordance with the present invention.
Figure 9C:
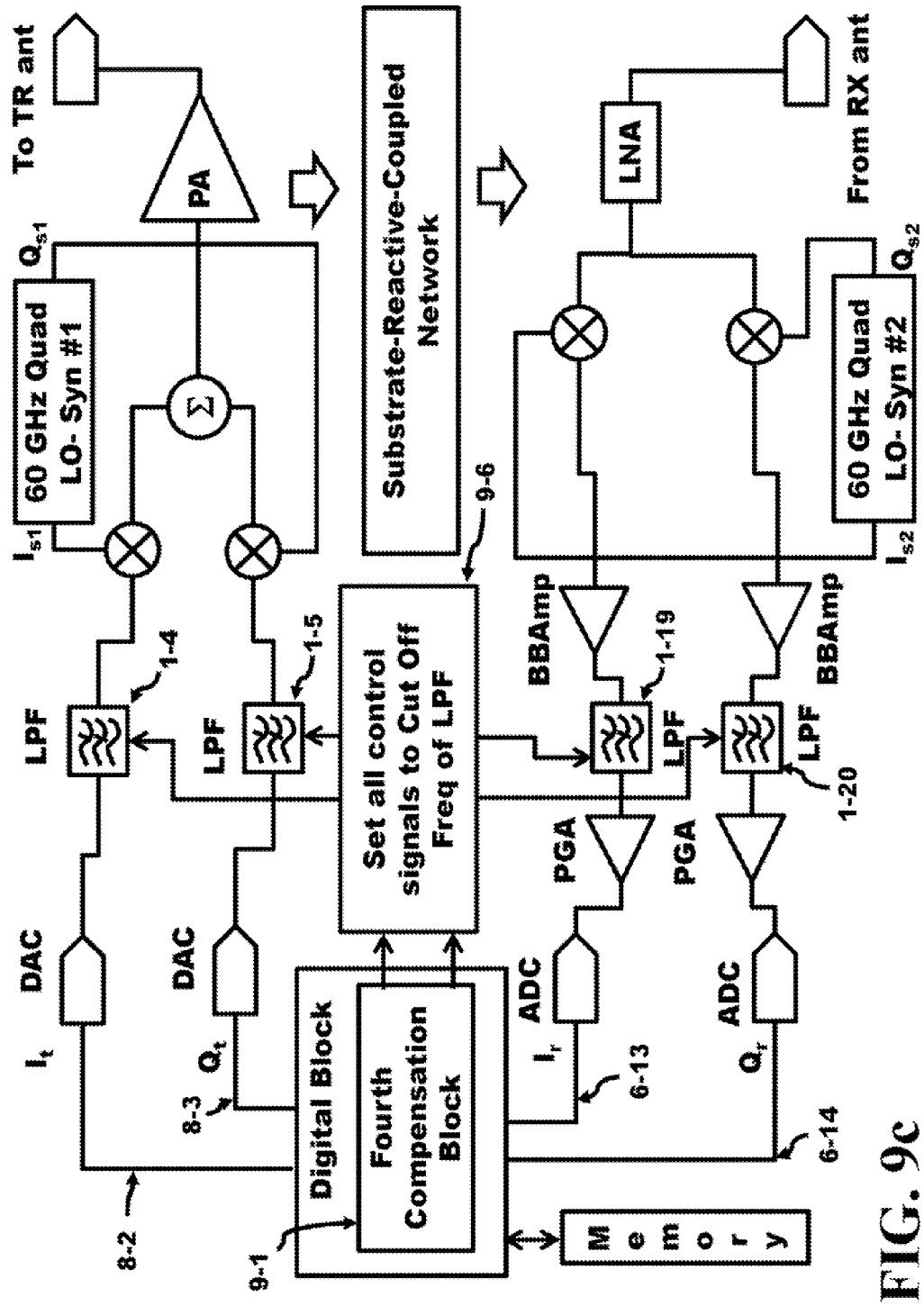
FIG. 9c depicts an SRC network closed loop path comprising a Fourth Compensation Block used to adjust the cut off bandwidth of both sets of LPFs in accordance with the present invention.

FIG. 9*a-c* illustrates the Cutoff Frequency Adjustment Network where this time a fourth compensated block 9-1 is configured or used in the digital block. This block in conjunction with the processor generates stimulus signals and adjusts the cutoff frequency of the transmit and receive LPFs. The fourth compensation block generates control stimulus signals to the LPFs to vary their bandwidth. The digital block provides the It 8-2 and Qt 8-3 digitals signals to the RF transmit chain. The LPF has a bandwidth that is set by control of the fourth compensation block and passes the frequency components of those signals corresponding to the allotted bandwidth of the LPF. The RF transmit chain up-converts these signals to the PA and then applies the signal to the LNA of the receive chain via the SRC Network. Once the receive chain down-converters the resultant signals to a digital Ir 6-13 and Qr 6-14 signals, the fourth Compensation block measures the amplitude of the signals to determine how the adjustments in the bandwidth of the LPFs are proceeding. The fourth compensation block then adjusts the bandwidth as required until the target cutoff frequency is achieved. However, since there are LPFs in the RF transmit chain and LPFs in the receive chain, only one of these chains can be adjusted at a time.

FIG. 9*a* depicts the case where the LPFs of the receive chain 1-19 and 1-20 are set to the maximum bandwidth 9-3 by control stimulus signals issued by the fourth compensation block. Then, the LPFs 1-4 and 1-5 of the RF transmit chain are adjusted 9-2 by a first set of control stimulus signals until the cutoff frequency of the RF transmit chain LPFs are at the desired bandwidth. The closed loop is completed by the SRC network. The signals are returned from the SRC network through the RF receive chain. The resultant signals of the receive chain are applied back to the fourth compensation block which determines the amplitude of the received signals to see if the bandwidth is at the appropriate cutoff frequency. Once the cutoff frequency is correct, the settings of the first set of compensated control signals of the transmit LPFs are stored in memory.

FIG. 9b illustrates the case where the LPFs of the RF transmit chain 1-4 and 1-5 are set to the maximum bandwidth 9-4 by control stimulus signals issued by the compensation block. Then, the LPFs 1-19 and 1-20 of the receive chain are adjusted 9-5 by a second set of control stimulus signals until the cutoff frequency of the receive chain LPFs are at the desired bandwidth. The stimuli signals are issued from the digital block through the RF transmit chain where the LPFs are set to full bandwidth. The closed loop path is completed by the SRC network. The signals are returned from the SRC network through the receive chain. The resultant signals of the receive chain are applied back to the fourth compensation block which determines the amplitude of the received signals to see if the bandwidth of the receive LPFs are at the appropriate cutoff frequency. Once the cutoff frequency is correct, the settings of the second set of compensated control signals of the receive LPFs are stored in memory.

FIG. 9c illustrates the case where the LPFs of the RF transmit chain 1-4 and 1-5 and receive chain 1-19 and 1-20 are set to the control values stored in memory setting the LPFs to the specified cutoff frequency 9-6. Since the cutoff frequency is has been determined at an earlier time, the RF transmit and receive chain LPFs are set to the correct cutoff frequency and the system is ready to be used in the field as a transceiver to TX/RX signals to/from the antennae to other transceivers in the communication network.

Figure 9D:
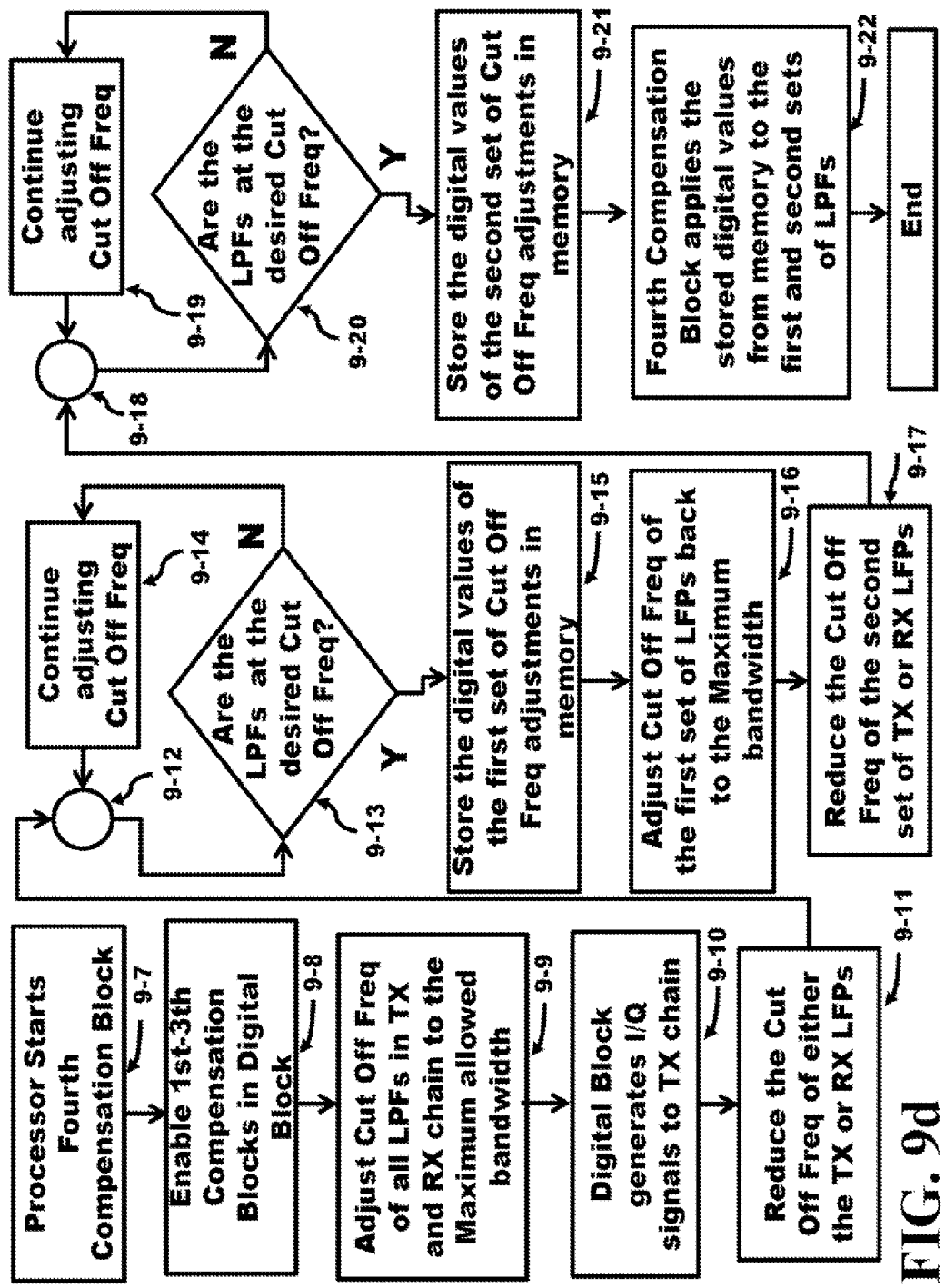
FIG. 9d illustrates a flow chart providing the Fourth Compensation steps used to adjust the cut off bandwidth of both sets of LPFs of the closed loop path in accordance with the present invention.

In FIG. 9d, the Cutoff Frequency Adjustment process begins with the processor starting the fourth compensation block for 9-7. Enable the first through the third compensation blocks in the digital block and apply the value stored in memory as indicated in 9-8. Next, adjust the cut off frequencies of all low pass filters in the RF transmit and receive chain to the maximum allowed bandwidth as indicated in 9-9. Let the digital block generate the I/Q signals to the RF transmit chain shown by 9-10. Then, reduce the cutoff frequency of either the transmit or receive LPFs as indicated in 9-11. Arriving at the bubble 9-12, the decision block 9-13 requests if the LPFs are at the desired cutoff frequency and if not continue adjusting the cutoff frequency until the LPFs are at the desired cutoff frequency through the loop including the loop 9-14, 9-12 and 9-13. Once the cutoff frequency for the LPFs have been achieved store the digital results of the first set of cut off frequencies in memory as indicated by 9-15. In the next step, adjust the cutoff frequencies of the first set of LPFs back to the maximum bandwidth indicated in 9-16. Then, reduce the cutoff frequency of the other or second set of transmit or receive low pass filters as indicated in 9-17. The next stop is the bubble 9-18 which moves us into the decision block 9-20. Are the LPFs at the desired cutoff frequency for the second set of LPFs, if not move to loop 9-19, 9-18 and 9-20 until the cutoff frequency of these LPFs are adjusted to the desired cutoff frequency? Once complete, store the digital values of the second set of cut off frequencies and adjustments into memory as indicated by 9-21. At this point the compensation of the cutoff frequencies of the LPFs have been determined, the fourth compensation block and then applies the stored control values from memory to the first and second sets of the LPFs as indicated in 9-22. And at this point the process moves to the end. The system is now ready to be fully operational.

Figure 10:
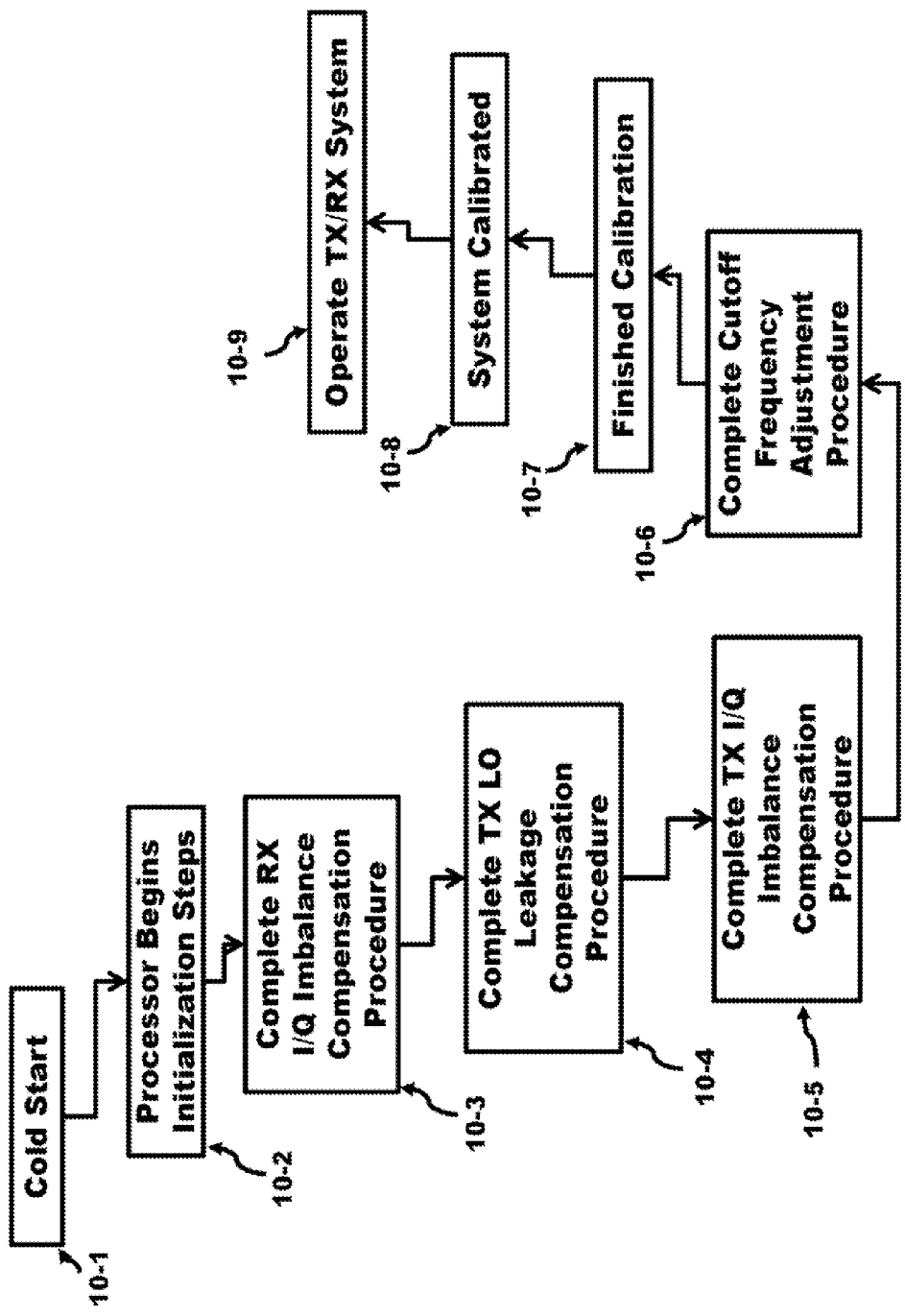
FIG. 10 depicts a flow chart providing the transceiver estimation/calibration steps' using the closed loop path starting from a cold start until the transceiver is calibrated in accordance with the present invention.

FIG. 10 presents the flow chart for the TX/RX starting from a cold start until the TX/RX is fully calibrated and ready for operation in the field. The process flow starts at cold start 10-1 where the transceiver is turned on and the processor begins the initialization steps 10-2. The RX I/Q Imbalance Compensation Procedure 10-3 is completed using the first estimation/compensation block within the digital block. The TX LO Leakage Compensation Procedure 10-4 is completed using the second estimation/compensation block within the digital block. The TX I/Q Imbalance Compensation Procedure 10-5 is completed using the third estimation/compensation block within the digital block. The Cutoff Frequency Adjustment Procedure 10-6 is completed using the fourth compensation block within the digital block. At this point, the calibration is complete 10-7 and the system is fully calibrated 10-8. The system now can be operated in the field as a TX RX system 10-9.

Finally, it is understood that the above description are only illustrative of the principle of the current invention. Various alterations, improvements, and modifications will occur and are intended to be suggested hereby, and are within the spirit and scope of the invention. This invention may, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. In accordance with these principles, those skilled in the art may devise numerous modifications without departing from the spirit and scope of the invention. Although the circuits were described using CMOS, the same circuit techniques can be applied to depletion mode devices and BJT or biploar circuits, since this tecnology allows the formation of current sources and source followers. When a device is specified, the device can be a transistor such as an N-MOS or P-MOS. The CMOS or SOI (Silicon on Insulator) technology provides two enhancement mode channel types: N-MOS (N-channel) and P-MOS (P-channel) devices or transistors.

What is claimed is:

1. A transceiver comprising:
   a digital block, a transmit chain, a substrate-reactive-coupled (SRC) network, and a receive chain serially coupled to form a closed loop;
   a plurality of estimation and/or compensation blocks in said digital block;
   a stimulus signal from said estimation and/or compensation block applied to said transmit chain; and
   said estimation and/or compensation block receives a resultant signal from said receive chain within said closed loop and estimating and/or compensating said resultant signal to calibrate said transceiver, wherein
   a first estimation/compensation block disables all transmit LPFs and DACs;
   a transmit LO leaks an I/Q sinusoidal signal into said transmit chain;
   an up-converted I/Q sinusoidal signal coupled into said receive chain by said SRC network;
   said resultant signal of said receive chain coupled into said first estimation/compensation block; and
   said first estimation/compensation block compensates an I/Q imbalance of said receive chain.

2. The transceiver of claim 1, further comprising;
a processor and a memory: and
said memory stores and retrieves all estimated or compensated outputs, wherein
said processor applies each said compensated outputs to a corresponding estimation and/or compensation block to fully calibrate said transceiver.
3. The transceiver of claim 1, wherein
a second estimation/compensation block disables all transmit LPFs and DACs;
said second estimation/compensation block adjusts an input DC value and/or internal bias point of all transmit mixers;
a transmit LO leaks an I/Q sinusoidal signal into said transmit chain;
an up-converted I/Q sinusoidal signal is coupled into said receive chain by said SRC network; and
said resultant signal of said receive chain coupled into said second estimation/compensation block, whereby
said second estimation/compensation block compensates said transmit LO leakage.
4. The transceiver of claim 1, further comprising:
a third estimation/compensation block enables all transmit LPF's and DAC's;
said third estimation/compensation block generates and couples I/Q signals into said transmit chain;
up-converted I/Q signals are coupled into said receive chain by said SRC network; and
said resultant output of said receive chain coupled into said third estimation/compensation block, whereby
said third estimation/compensation block compensates an I/Q imbalance of said transmit chain.
5. The transceiver of claim 1, further comprising:
a fourth compensation block generates and couples I/Q signals into said transmit chain;
said fourth compensation block adjusts all transmit and receive LPFs to a maximum bandwidth;
said fourth compensation block adjusts said transmit or receive LPFs to a cutoff frequency and stores first results from said LPFs into a memory:,
said fourth compensation block adjusts all LPFs to said maximum bandwidth; and
said fourth compensation block adjusts said other LPFs to said cutoff frequency and stores second results from said LPL's into said memory.
6. A transceiver comprising:
a digital block, a transmit chain, a substrate-reactive-coupled (SRC) network, and a receive chain serially coupled to form a closed loop;
a plurality of estimation and/or compensation blocks in said digital block;
a stimulus signal from said estimation and/or compensation block applied to said transmit chain; and
said estimation and/or compensation block receives a resultant signal from said receive chain within said closed loop and estimating and/or compensating said resultant signal to calibrate said transceiver, wherein
a second estimation/compensation block disables all transmit LPFs and DACs;
said second estimation/compensation block adjusts an input DC value and/or internal bias point of all transmit mixers;
a transmit LO leaks an I/Q sinusoidal signal into said transmit chain;
an up-converted I/Q sinusoidal signal is coupled into said receive chain by said SRC network; and
said resultant signal of said receive chain coupled into said second estimation/compensation block, whereby
said second estimation/compensation block compensates said transmit LO leakage.
7. The transceiver of claim 6, further comprising;
a processor and a memory; and
said memory stores and retrieves all estimated or compensated outputs, wherein
said processor applies each said compensated outputs to a corresponding estimation and/or compensation block to fully calibrate said transceiver.
8. The transceiver of claim 6, wherein
a first estimation/compensation block, disables all transmit LPFs and DACs;
a transmit LO leaks an I/Q sinusoidal signal into said transmit chain;
an up-converted I/Q sinusoidal signal coupled into said receive chain by said SRC network;
said resultant signal of said receive chain coupled into said first estimation/compensation block; and
said first estimation/compensation block compensates an I/Q imbalance of said receive chain.
9. The transceiver of claim 6, further comprising:
a third estimation/compensation block enables all transmit LPFs and DACs;
said third estimation/compensation block generates and couples I/Q signals into said transmit chain;
up-converted I/Q signals are coupled into said receive chain by said SRC network; and
said resultant output of said receive chain coupled into said third estimation/compensation block, whereby
said third estimation/compensation block compensates an I/Q imbalance of said transmit chain.
10. The transceiver of claim 6, further comprising:
a fourth compensation block generates and couples I/Q signals into said transmit chain;
said fourth compensation block adjusts all transmit and receive LPFs to a maximum bandwidth:
said fourth compensation block adjusts said transmit or receive LPFs to a cutoff frequency and stores first results from said LPFs into a memory;
said fourth compensation block adjusts all LPFs to said maximum bandwidth; and
said fourth compensation block adjusts said other LPFs to said cutoff frequency and stores second results from said LPFs into said memory.
11. A transceiver comprising:
a digital block, a transmit chain, a substrate-reactive-coupled (SRC) network, and a receive chain serially coupled to form a closed loop;
a plurality of estimation and/or compensation blocks in said digital block;
a stimulus signal from said estimation and/or compensation block applied to said transmit chain:
said estimation and/or compensation block receives a resultant signal from said receive chain within said closed loop and estimating, and/or compensating said resultant signal to calibrate said transceiver;
a fourth compensation block generates and couples I/Q signals into said transmit chain;
said fourth compensation block adjusts all transmit and receive LPFs to a maximum bandwidth;
said fourth compensation block adjusts said transmit or receive LPFs to a cutoff frequency and stores first results from said LPFs into a memory;
said fourth compensation block adjusts all LPFs to said maximum bandwidth; and said fourth compensation block adjusts said other LPFs to said cutoff frequency and stores second results from said LPFs into said memory.

12. The transceiver of claim 11, further comprising:
a processor and a memory; and
said memory stores and retrieves all estimated or compensated outputs, wherein
said processor applies each said compensated outputs to a corresponding estimation and/or compensation block to fully calibrate said transceiver.

13. The transceiver of claim 11, wherein
a first estimation/compensation block disables all transmit LPFs and DACs:
a transmit LO leaks an I/Q sinusoidal signal into said transmit chain;
an up-converted I/Q sinusoidal signal coupled into said receive chain by said SRC network;
said resultant signal of said receive chain coupled into said first estimation/compensation block; and
said first estimation/compensation block compensates an I/Q imbalance of said receive chain.

14. The transceiver of claim 11, wherein
a second estimation/compensation block disables all transmit LPFs and DACs;
said second estimation/compensation block adjusts an input DC value and/or internal bias point of all transmit mixers;
a transmit LO leaks an I/Q sinusoidal signal into said transmit chain;
an up-converted I/Q sinusoidal signal is coupled into said receive chain by said SRC network; and
said resultant signal of said receive chain coupled into said second estimation/compensation block, whereby
said second estimation/compensation block compensates said transmit LO leakage.

15. The transceiver of claim 11, further comprising:
a third estimation/compensation block enables all transmit LPFs and DACs;
said third estimation/compensation block generates and couples I/Q signals into said transmit chain;
up-converted I/Q signals are coupled into said receive chain by said SRC network; and
said resultant output of said receive chain coupled into said third estimation/compensation block, whereby
said third estimation/compensation block compensates an imbalance of said transmit chain.

* * * * *